United States Patent
Shimizu

(10) Patent No.: US 8,189,711 B2
(45) Date of Patent: May 29, 2012

(54) TRANSMISSION CONTROLLING METHOD IN WIRELESS COMMUNICATIONS SYSTEM AND RECEIVER FOR USE IN THE SAME SYSTEM

(75) Inventor: Masahiko Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 948 days.

(21) Appl. No.: 12/213,850

(22) Filed: Jun. 25, 2008

(65) Prior Publication Data
US 2008/0310549 A1 Dec. 18, 2008

Related U.S. Application Data

(63) Continuation of application No. PCT/JP2005/023958, filed on Dec. 27, 2005.

(51) Int. Cl.
*H04L 27/00* (2006.01)
(52) U.S. Cl. .................... 375/295; 375/260; 375/267
(58) Field of Classification Search .............. 375/295, 375/296, 260, 267
See application file for complete search history.

(56) References Cited

U.S. PATENT DOCUMENTS

| | | | |
|---|---|---|---|
| 6,341,224 B1 | 1/2002 | Dohi et al. | |
| 6,717,976 B1 | 4/2004 | Shen | |
| 2002/0123349 A1 | 9/2002 | Miyoshi et al. | |
| 2003/0087644 A1 | 5/2003 | Miyoshi et al. | |
| 2005/0143120 A1 | 6/2005 | Cave et al. | |
| 2007/0133708 A1* | 6/2007 | Lee et al. | 375/267 |
| 2008/0192683 A1* | 8/2008 | Han et al. | 370/329 |

FOREIGN PATENT DOCUMENTS

| | | |
|---|---|---|
| EP | 1128577 A1 | 8/2001 |
| JP | 2000196522 | 7/2000 |
| JP | 200144930 | 2/2001 |
| JP | 2003-218789 | 7/2003 |
| JP | 2005-012321 | 1/2005 |
| JP | 2005-347815 | 12/2005 |

OTHER PUBLICATIONS

Notice of Ground of Rejection Office Action mailed Dec. 14, 2010, in corresponding patent application No. 2007-551839.
Extended European Search Report dated Feb. 6, 2012 issued in application No. 05822728.1 - 1237/1971046 PCT/ J132005/023958.

* cited by examiner

*Primary Examiner* — Chieh M. Fan
*Assistant Examiner* — Freshteh N Aghdam
(74) *Attorney, Agent, or Firm* — Murphy & King, P.C.

(57) ABSTRACT

The present invention relates to a transmission controlling method in a wireless communications system and a receiver for use in the same system. The invention aims at realizing power control (or transmit rate control) more effective than previous techniques by means of utilizing a certain relationship between an error rate and an evaluation amount relating to the estimation amount. Thus, a certain relationship is defined between the evaluation amount relating to a reception condition and an error rate on the receiver, and on the basis of this certain relationship, transmit power of the transmitter is controlled.

12 Claims, 18 Drawing Sheets

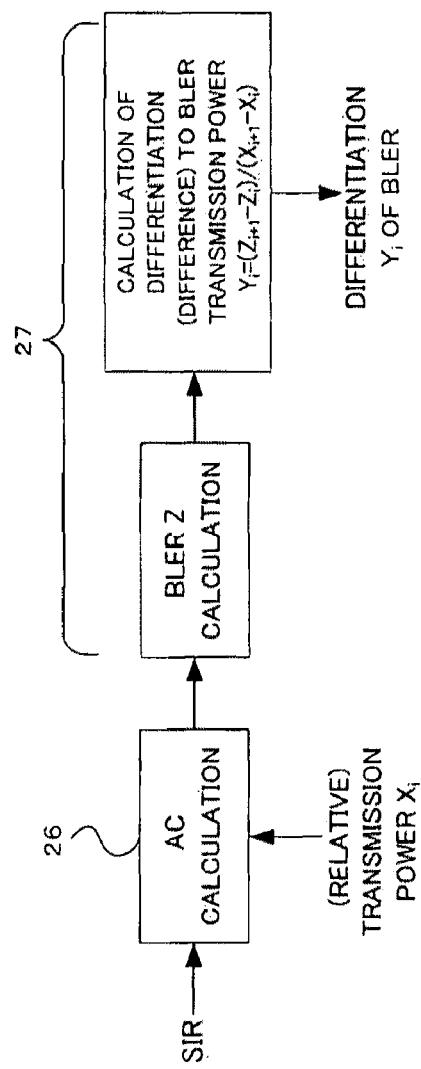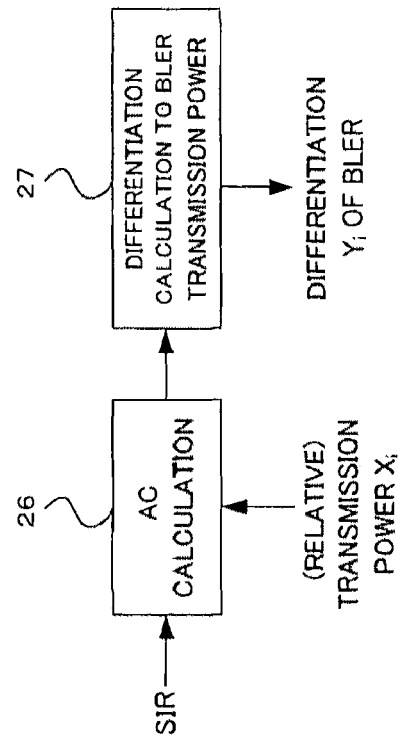

TRANSMISSION CONTROLLING METHOD IN WIRELESS COMMUNICATIONS SYSTEM AND RECEIVER FOR USE IN THE SAME SYSTEM

CROSS-REFERENCE TO RELATED APPLICATIONS

This is a continuation application of International Application Number PCT/JP2005/023958, which was filed on Dec. 27, 2005.

TECHNICAL FIELD

The present invention relates to a transmission controlling method in a wireless communications system and a receiver for use in the same system. The present invention relates to the technology suitable for use in transmit power control or communications (transmit) rate control with a wireless communications scheme employing strong error correction codes such as turbo codes or Low Density Parity Check Codes (LDPC).

BACKGROUND ART

In mobile communications schemes, transmit power and communications (transmit) rate is controlled in accordance with the type of communications data such as audio communications and packet communications for realizing desired quality thereof.

Wideband-Code Division Multiple Access (W-CDMA) controls transmit power in such a manner that a Signal to Interference Ratio (SIR) is maintained constant (hereinafter will be called the previous example 1). Further, control called outer loop for obtaining the SIR corresponding to a desired BLER is also performed since signal quality [an error rate such as a Block Error Rate (BLER)] and the SIR depend on propagation circumstances.

This control method performs control such that a instantaneous SIR is made to be constant with respect to the time unit of measuring a BLER for realizing a desired BLER. Thus, transmit power is enlarged under a condition where propagation circumstances are poor. However, there are cases where a total transmit power can be decreased by deteriorating quality when propagation circumstances are poor and improving the quality when circumstances are fine.

Accordingly, a control method which finds a relationship such that an error rate (BLER) and a reception condition (reception feature) becomes 1 to 1, being independent from propagation circumstances, is proposed in, for example, the following patent document 1 (hereinafter will be called the previous example 2).

Normally, a relationship of BLER relating to a Signal to Noise Ratio (SNR) or a power density to noise power density ratio Eb/N0 or the like depends on propagation circumstances as shown in FIG. 19, so that it is impossible to give a 1-to-1 relationship. In this instance, this FIG. 19 is on the assumption that the number of information bits (transmit block size) for a single code block (1 coding unit) is 3000. In the figure, the curve indicated by the reference character 100 is an error rate (BLER) under static circumstances with no fading; the curve indicated by the reference character 200 is an error rate (BLER) under infinite circumstances in which the speed of fading is extremely high; the curve indicated by the reference character 300 is an error rate (BLER) under circumstances in which a fading frequency is about 3 Hz; the curve indicated by the reference character 400 is an error rate (BLER) under circumstances in which a fading frequency is about 80 Hz; the curve indicated by the reference character 500 is an error rate (BLER) under circumstances in which a fading frequency is about 240 Hz.

In a system employing a strong error correction codes such as turbo codes or LDPC codes, it is conceivable that a tendency of capacity being close to the theoretical value thereof will be exhibited. In a case where transmit power is controlled in such a manner that an evaluation amount C(P) (hereinafter also simply called the "evaluation value C") expressed by the following formula (1) maintains constant by the unit of code block, an error rate relating to an evaluation amount C has approximately the same feature (1-to-1 relationship) independent from propagation circumstances such as fading as shown in, for example, FIG. 20. In this instance, the curves (features) indicted by the reference characters 100, 200, 300, 400, and 500 in this FIG. 20 correspond to those shown in FIG. 19.

$$C(P) = \frac{1}{M} \sum_{i=0}^{M-1} \log\left(1 + \alpha \frac{A_i P_i}{N_i}\right) \quad (1)$$

where P is transmit power; A is a channel value in propagation circumstances such as fading; N is interference and noise power; α is a constant; M is the number of symbols or the number of blocks each formed by more than one symbol. FIG. 20 shows a case where turbo codes with a coding rate of ⅓ and a constraint length of 4 is used, and α=2 in the above formula (1). Hereinafter, the evaluation amount C in the above formula (1) will be called AC (Approximated Capacity).

From this relationship between an error rate (BLER) and an AC, being independent from propagation circumstances, the technique of the previous example 2 performs transmit power control in such a manner that an AC maintains constant, and performs transmit power control following the water filling theory in the unit of code block (coding), thereby obtaining a desired BLER with a transmit power as small as possible. In this case, performing control in such a manner that an AC maintains constant means that control is performed indirectly in such a manner that the BLER of each code block maintains constant.

Patent Document 1: Japanese Patent Application Laid-open No. 2005-12321

DISCLOSURE OF THE INVENTION

Issue(s) to be Solved by the Invention

However, although the technique disclosed in the above patent document 1 describes the fact that the relationship between a BLER and AC is independent from propagation circumstances, the relationship is not clarified (formulated), so that so far as the power control method (transmit power distribution) for inter-code block cannot be optimized. That is, in order to obtains desired signal quality, a constant control of AC, which merely is an indirect method, can be employed, so that the method cannot necessarily be the optimal transmit control method. Hence, the finally obtained BLER can be a desired value, but control such that desired signal quality is realized needs to be done for each of the code blocks, so that it cannot be that the method is the most efficient power control method.

The present invention is originated in view of such an issue. One object of the present invention is to clarify the relationship between an error rate and an evaluation amount (AC) relating to a reception condition, thereby optimizing the power control method (transmit power distribution) for inter-code block for realizing more efficient power control than that of the previous technique. In addition, another object of the present invention is to realize more efficient transmit rate control utilizing the above relationship.

Means to Solve the Issue(s)

The present invention may be used in the transmission controlling method in a wireless communications system described below and a receiver for use in the same system.

(1) As a generic aspect, there provided is a transmission controlling method for use in a wireless communications system including: a transmitter which codes a transmission signal with use of an error correction code exhibiting a tendency of a communications capacity being close to its theoretical value; and a receiver which receives the transmission signal from the transmitter, the method comprising: defining a certain relationship for the unit of code block between an evaluation amount relating to a reception condition of the transmission signal and an error rate of a code block obtained from reception power quality on the receiver, which relationship does not depend on propagation circumstances between a transmitter and a receiver; and controlling a transmission power of the transmission signal to be transmitted from the transmitter based on the above mentioned certain relationship.

(2) As a preferred aspect, the evaluation amount C(P) is expressed by the following formula (A) and the error rate is related to the evaluation amount C(P)

$$C(P) = \frac{1}{M} \sum_{i=0}^{M-1} \log\left(1 + \alpha \frac{A_i P_i}{N_i}\right) \quad (A)$$

where P is transmission power; A is a channel value of a propagation path in the propagation circumstances; N is interference and noise power in the propagation circumstances; $\alpha$ is a constant; M is the number of symbols in a unit of coding or the number of blocks each formed by a plurality of symbols.

(3) As yet another preferred aspect, The transmission controlling method as set forth in claim 2, wherein the error rate is expressed by the following formula (B):

$$f(P) = \exp[a_0 + a_1 C(P) + a_2 C(P)^2] \quad (B)$$

where each of the $a_0$, $a_1$, and $a_2$ is a constant.

(4) As still another preferred aspect, the transmission power control is executed in such a manner that a differential value by the power P in the formula (B) takes a fixed value.

(5) As a further preferred aspect, the transmission power control is executed for inter-code block under the transmission power in a code block being constant.

(6) As a yet further preferred aspect, the transmission power control is executed for inter-divisional unit obtained by dividing the code block.

(7) As another generic aspect, there provide is a transmission controlling method for use in a wireless communications system including: a transmitter which codes a transmission signal with use of an error correction code exhibiting a tendency of a communications capacity being close to its theoretical value; and a receiver which receives the transmission signal from the transmitter, the method comprising: defining a certain relationship for the unit of code block between an evaluation amount relating to a reception condition of the transmission signal and an error rate of a reception signal on the receiver, which relationship is independent from propagation circumstances between a transmitter and a receiver; and controlling a transmission rate of the transmission signal to be transmitted from the transmitter based on the defined relationship.

(8) As a preferred aspect, the evaluation amount C(P) is expressed by the following formula (A) and the error rate is related to the in the evaluation amount C(P).

(9) As another preferred aspect, the error rate is expressed by the above formula (B).

(10) As yet another preferred aspect, determination of the transmission power is executed in such a manner that a multiplication value between the transmission data amount of the transmission signal and (1−the above error rate) takes the maximum value.

(11) As yet another generic aspect, there provided is a receiver for use in a wireless communications system including: a transmitter which codes a transmission signal with use of an error correction code exhibiting a tendency of a communications capacity being close to its theoretical value; and a receiver which receives the transmission signal from the transmitter, the receiver comprising, transmission control information generating means which generates transmission control information for controlling a transmission power of the transmission signal to be transmitted from the transmitter based on a certain relationship for the unit of code block defined between an evaluation amount relating to a reception condition of the transmission signal and an error rate of a code block obtained from reception electric power quality, which relationship is independent from propagation circumstances between a transmitter and a receiver; and notifying means which notifies the transmitter of the transmission control information generated by the transmission control information generating means.

(12) As a preferred aspect, the transmission control information generating means includes: an evaluation amount calculating unit which calculates the evaluation amount C(P) using the following formula (A); and a transmission power determining unit which determines the transmission power and performs generation thereof as the transmission control information based on the calculated evaluation amount C(P) and the error rate relating to the evaluation amount C(P), and performs generation thereof as the transmission control information:

(13) As another preferred aspect, the transmission power determining unit is operable to determine the transmission power based on a relationship between the evaluation amount C (P) calculated by the evaluation amount calculating unit and an error rate f(P) expressed by the above formula (B).

(14) As yet another preferred aspect, the transmission power determining unit is operable to determine the transmission power in such a manner that a differential value by the power P in the above formula (B) takes a fixed value.

(15) As still another preferred aspect, the transmission control information generating unit is operable to generate the transmission power control information for controlling the transmission power relating to inter-code block under the transmission power of inter-code block being constant.

(16) As a further preferred aspect, the transmission control in formation generating unit is operable to generate the transmission control information for controlling the transmission power for inter-divisional unit obtained by dividing the code block.

(17) As a still another generic aspect, there provided is a receiver for use in a wireless communications system including: a transmitter which codes a transmission signal with use of an error correction code exhibiting a tendency of a communications capacity being close to its theoretical value; and a receiver which receives the transmission signal from the transmitter, the receiver comprising: transmission control information generating means which generates transmission control information for controlling a transmission rate of the transmission signal to be transmitted from the transmitter based on a certain relationship for the unit of code block defined between an evaluation amount relating to a reception condition of the transmission signal and an error rate of a code block obtained from reception electric power quality, which relationship is independent from propagation circumstances between a transmitter and receiver; and notifying means which notifies the transmitter of the transmission control information generated by the transmission control information generating means.

(18) As a preferred aspect, the transmission control information generating means includes: an evaluation amount calculating unit which calculates an evaluation amount C(P) expressed by the above formula (A) as the evaluation amount; and a transmission power determining unit which determines the transmission rate and performs generation thereof as the transmission control information based on an evaluation amount C(P) calculated by the evaluation amount calculating unit and on the error rate relating to the evaluation amount C(P) in the certain relationship.

(19) As another preferred aspect, the transmission rate determining unit is operable to determine the transmission rate based on a relationship between the evaluation amount C(P) calculated by the evaluation amount calculating unit and an error rate f(P) expressed by the above formula (B).

(20) As yet another preferred aspect, the transmission rate determining unit is operable to determine the transmission data amount in such a manner that a multiplication value between the transmission data amount of the transmission signal and (1−the above error rate) takes the maximum value.

Effects of the Invention

According to the present invention, at least any one of the following effects and benefits may be obtained.

(1) Since it is possible to give a transmit power distribution with an error rate directly averaged being the minimum or a transmit power distribution with an average transmit power being the minimum when a certain error rate is realized, an efficient power control is realized.

(2) Further, by means of performing transmit power control based on the certain relationship not only for inter-unit of coding but also in the unit of coding, it is possible to realize a more efficient power control.

(3) Furthermore, it is also possible to realize transmit rate control such that an average transmit rate becomes the maximum in a case where a certain error rate is realized.

BRIEF DESCRIPTION OF THE DRAWINGS

FIG. 3 is a diagram for describing an example in which a differentiation of BLER is obtained from transmission power utilizing a BLER in the system shown in FIG. 2;

FIG. 4 is a diagram for describing an example in which a differentiation of a BLER is directly obtained from transmission power in the system shown in FIG. 2;

Figure 15:
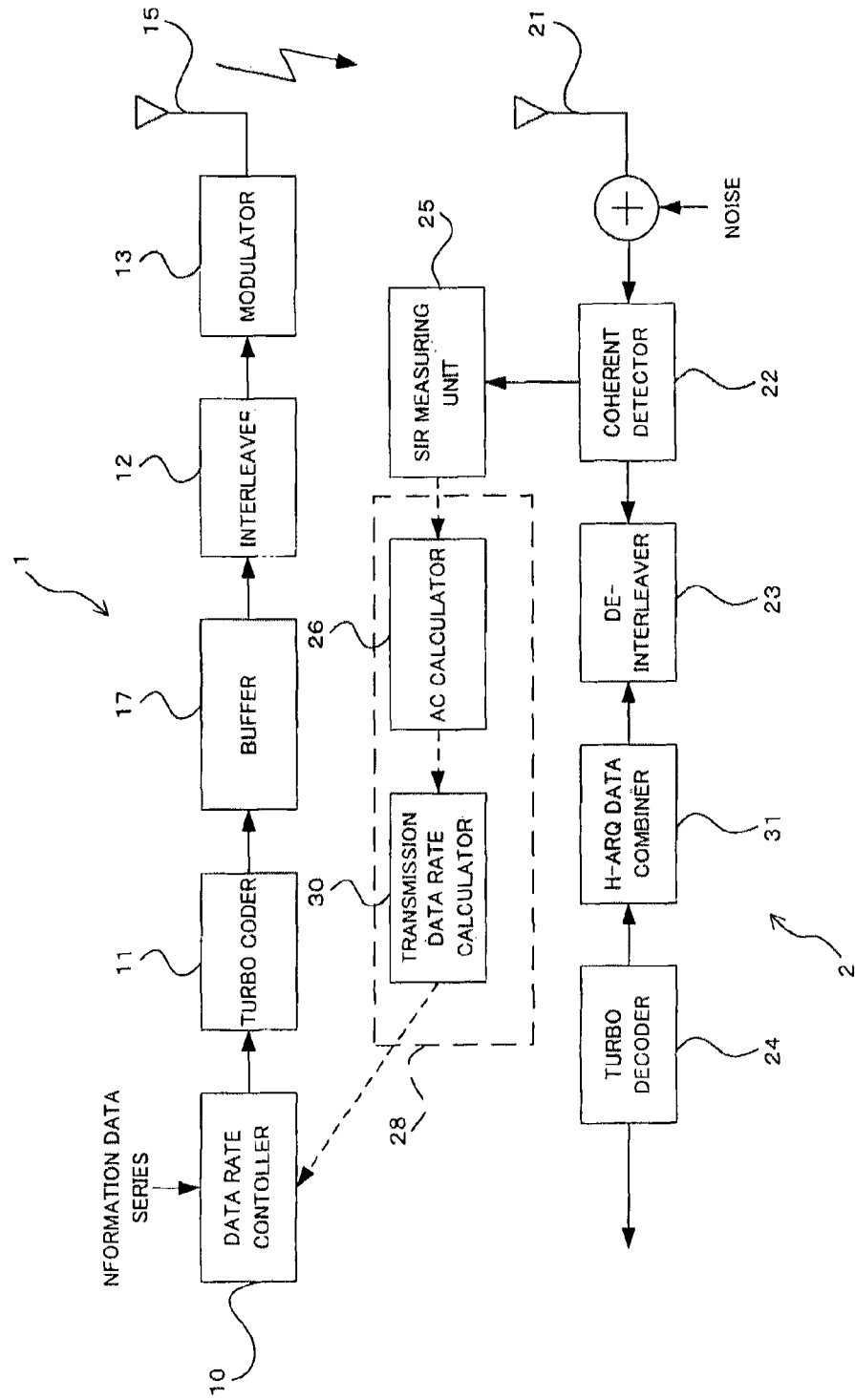
FIG. 15 is a block diagram illustrating a construction of a wireless communications system according to a second embodiment.
Figure 17:
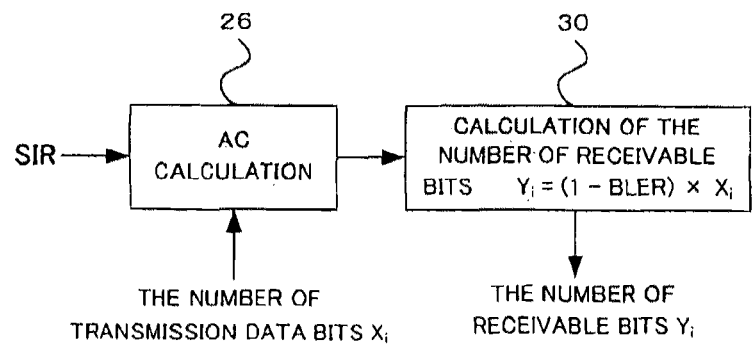
Figure 18:
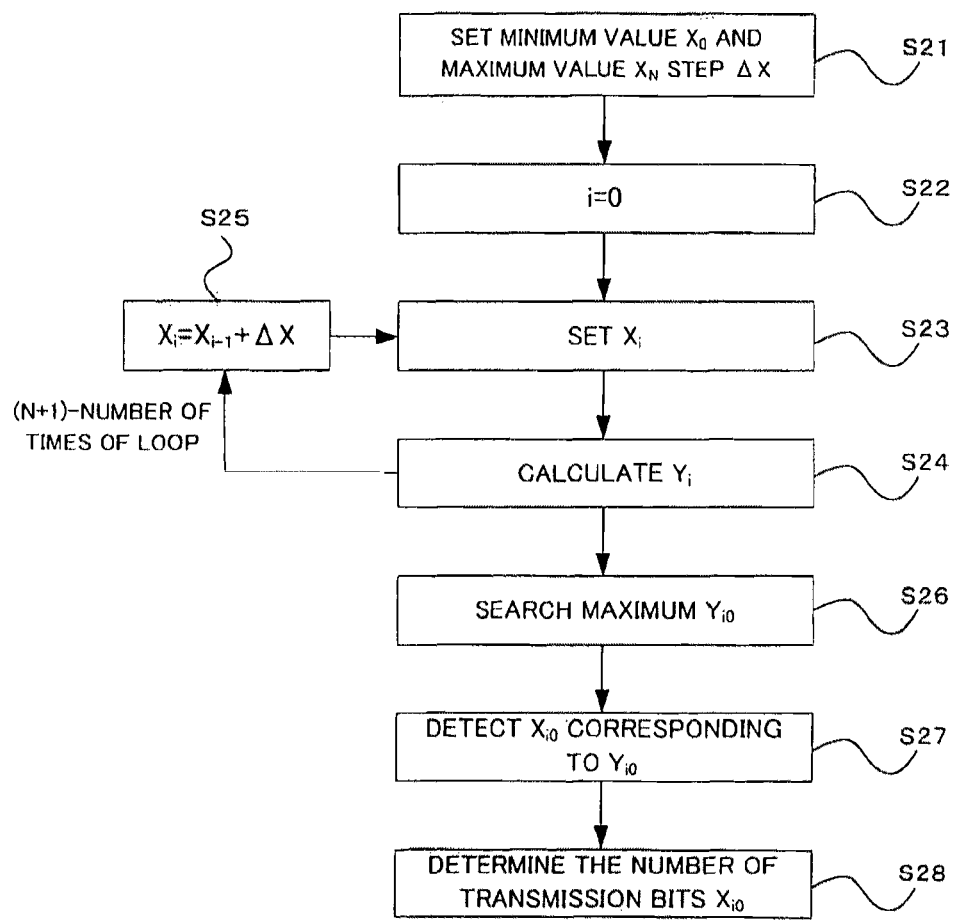
Figure 19:
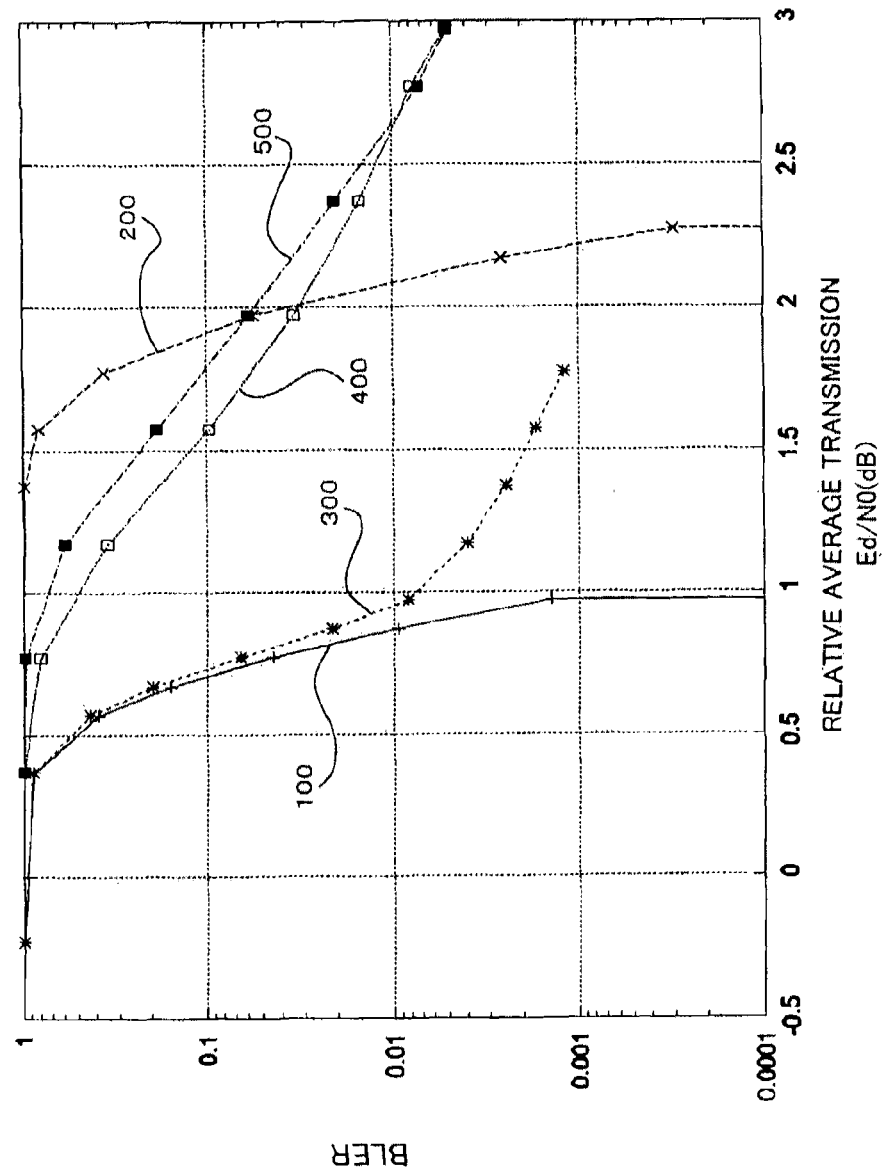
Figure 20:
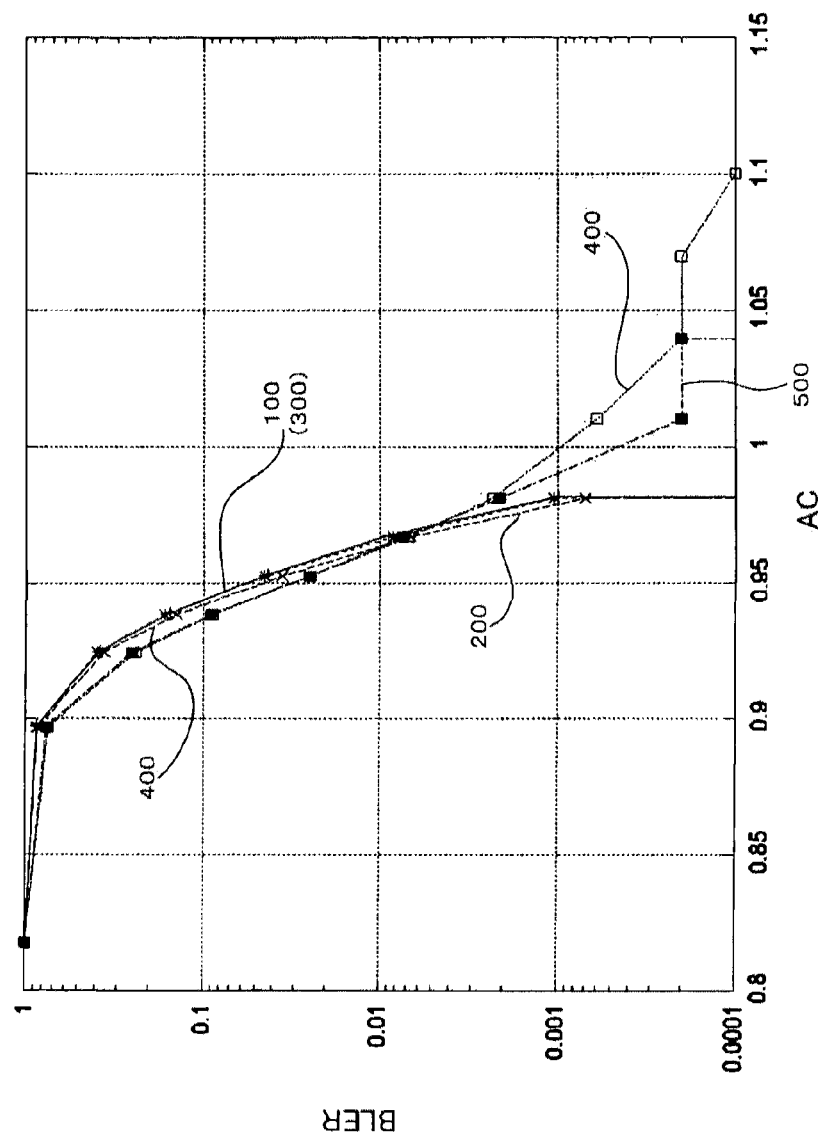

(A) and (B) of FIG. 16 each is schematic diagrams for describing that transmission energy per code block is constant in the second embodiment;

FIG. 17 is a diagram for describing an example of obtaining the number of receivable bits from the number of transmit data bits (transmit data amount) in the system shown in FIG. 15;

FIG. 18 is a flowchart for describing an example of a method for determining a communications (transmission) rate in the system shown in FIG. 15;

FIG. 19 is a graph indicating a BLER feature example against an SNR (relative average reception Eb/N0);

FIG. 20 is a graph indicating an example of a BLER feature against AC.

DESCRIPTION OF REFERENCE CHARACTERS

1 . . . transmitter
11 . . . turbo coder
12 . . . interleaver
13 . . . modulator
14 . . . power controller
15 . . . transmitter antenna
2 . . . receiver
21 . . . receiver antenna
22 . . . coherent detector
23 . . . de-interleaver
24 . . . turbo decoder
25 . . . SIR Measurer
26 . . . AC calculator 27 ... transmit power calculator
28 ... transmit control information generating means
29 ... target transmit power calculator
30 ... transmit data rate calculator

BEST MODE FOR CARRYING OUT THE INVENTION

Embodiments will now be described with reference to the relevant accompanying drawings.

[A] General Description

To express (define) a relationship between the above described error rate (BLER) and an estimation amount AC of a reception condition in an approximate manner as shown by the following formula (2), induces an appropriate (certain) relationship for inter-code block unit:

$$f(P)=\exp[a_0+a_1C(P)+a_2C(P)^2] \quad (2)$$

Figure 1:
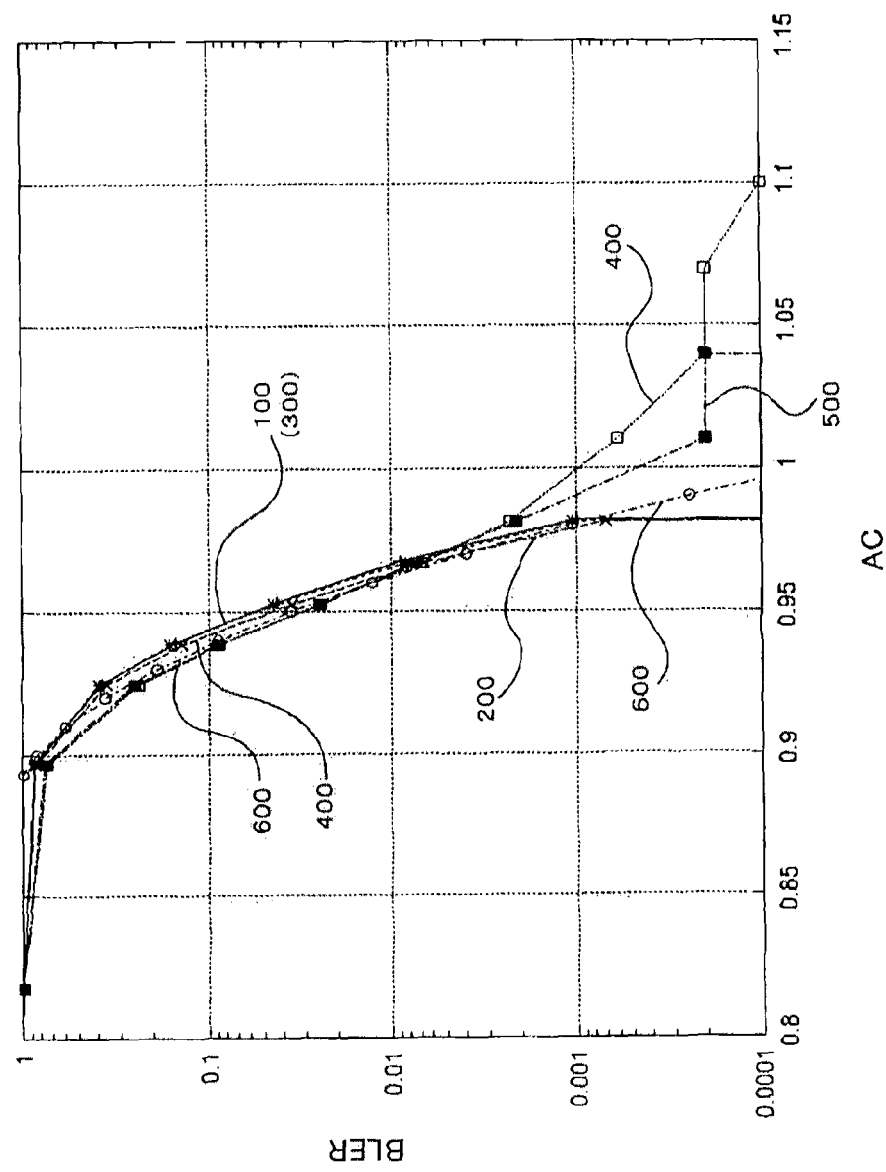
FIG. 1 is a graph indicating a relationship between an estimation amount approximated capacity (AC) and an error rate (Block Error Rate: BLER) relating to a reception condition according to a first embodiment.

FIG. 1 is a graph in which a relationship (dotted line 600) expressed by the above formula (2) is added to the relationship between an BLER and AC indicated in FIG. 20. In this instance, in this formula (2), $a_0$, $a_1$, and $a_2$ each are constants. For example, in FIG. 1, the curve 600 is determined to have the minimum square distance in a relation with each of the curves 100 through 500 (fitting).

Here, if a total of transmit power during a certain duration is given to be constant, a power distribution which minimizes the error rate (BLER) expressed by the above formula (2) is a transmit power with which a value obtained by differentiating the above formula (2) by a power P becomes constant, that is, a transmit power satisfying the following formula (3) based on the Gibbs law:

$$\frac{\partial f(P_i)}{\partial P_i} = cons. \quad (3)$$

Figure 7:
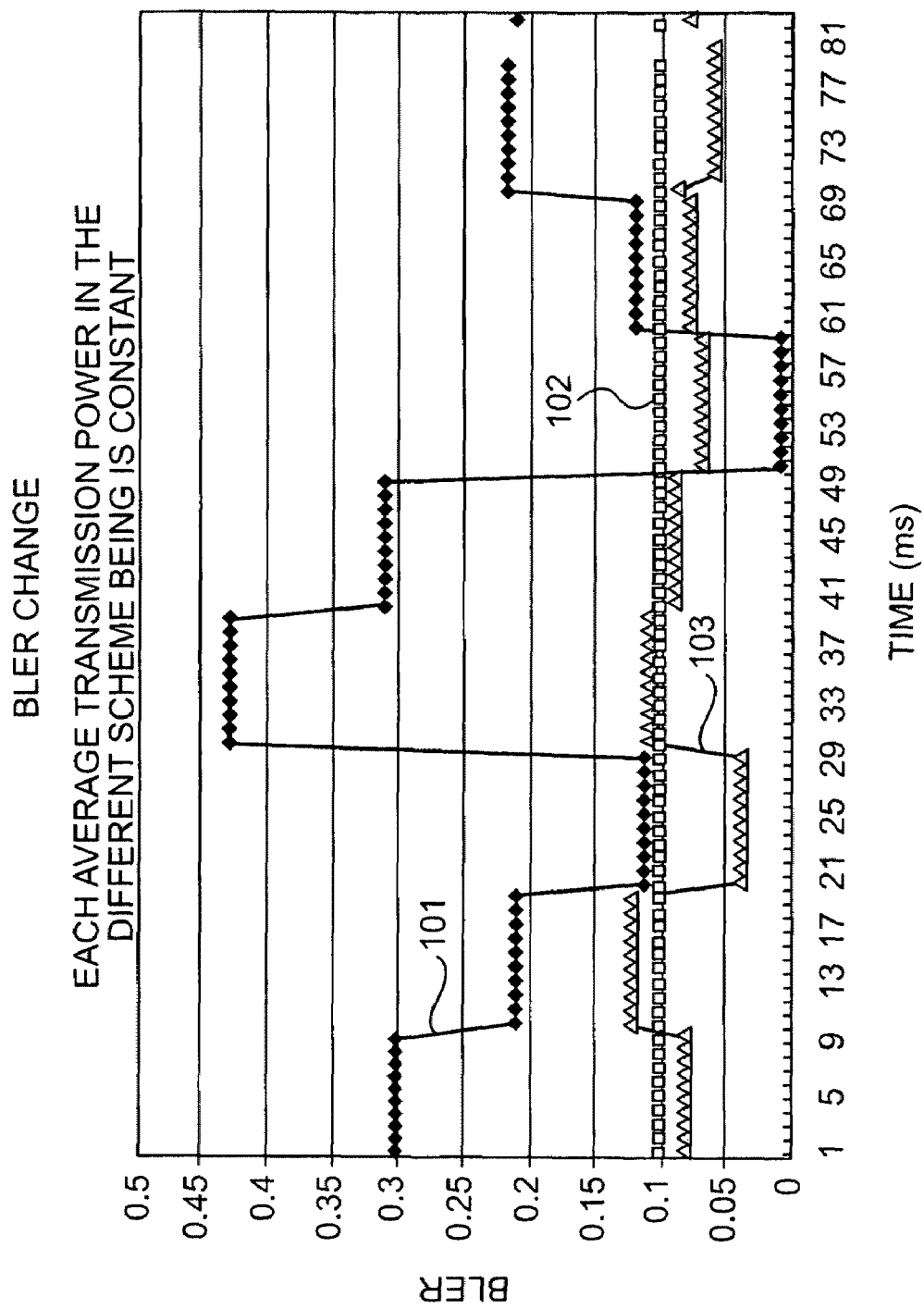
FIG. 7 is a diagram showing a BLER feature example for making a description in comparison between power control according to the first embodiment with power control according to the previous example of power control.

By means of giving a power distribution satisfying this formula (3), a transmit power distribution which minimizes a directly averaged BLER, or a transmit distribution with which an average transmit power becomes the minimum when realizing a certain BLER, is given (for example, see the feature with the reference character 103 in FIG. 7).

In this instance, FIG. 7 shows changes of the BLER in a case where an average transmit power is constant. The reference character 101 shows a characteristic under power control according to the above described previous example 1; the reference character 102 shows a characteristic under power control according to the above described previous example 2.

As shown in FIG. 7, according to the previous example 1 (characteristic 101), in a case where an average transmit power is made to be constant, a BLER changes greatly by the unit of code block of the order of 10 ms. In other words, control for making an SIR constant is performed for realizing a desired BLER, so that the average transmit power changes greatly (a transmit power becomes large at the time propagation circumstances are poor). On the other hand, in the previous example 2 (characteristic 102), since control for making AC constant in each code block is performed to control a BLER to be constant, the BLER does not change even when the average transmit power is made to be constant. However, as already described, it cannot necessarily be that such transmit power control for making the BLER constant is the optimal control.

In contrast, since the present embodiment (characteristic 103) rather deteriorates signal quality (BLER) when the propagation circumstances are poor, and also improves the signal quality when the propagation circumstances are fine, thereby performing transmit power control (power distribution) in which an average BLER is made to be the minimum, a total average transmit power can be made to be the minimum.

Figure 6:
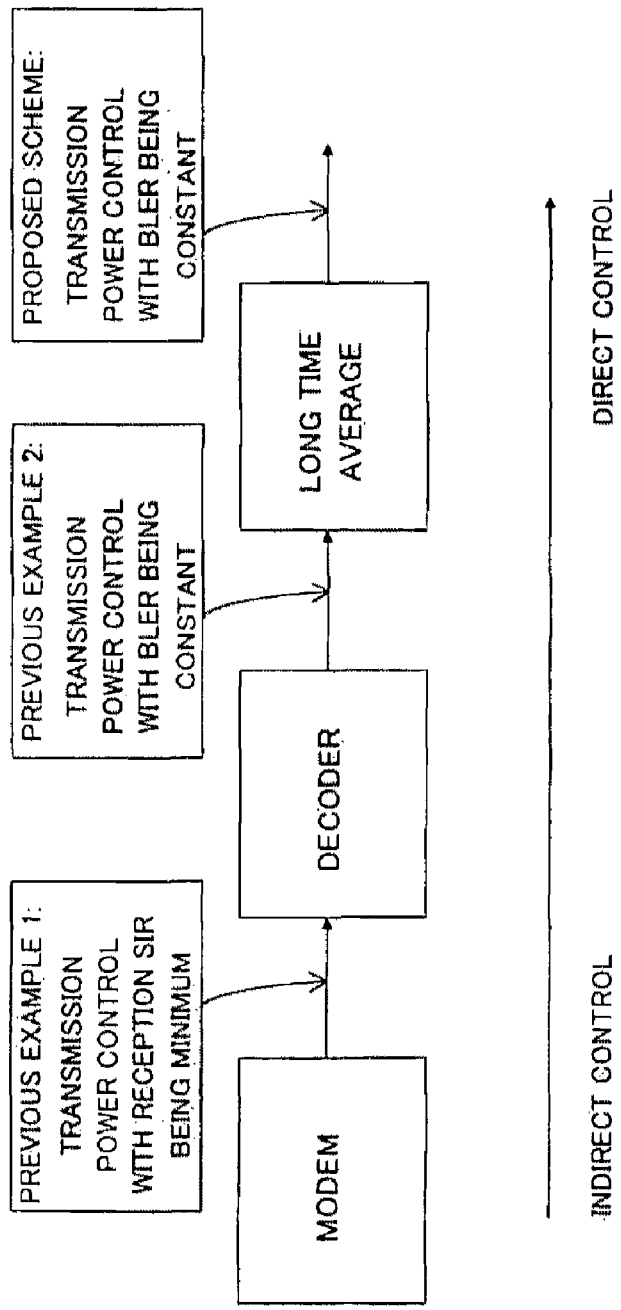
FIG. 6 is an image diagram for describing differences between power control according to the first embodiment and the previous example of power control.

That is, as shown in an image diagram of FIG. 6, for example, the previous example 1 is capable of performing only an indirect control, such as transmit power control to make a reception SIR in an output of a modem, etc., constant in the previous example land transmit power control to make a BLER constant in an output of a decoder, etc. In contrast to this, the present embodiment is capable of realizing transmit power control for making a BLER the minimum when long time averaging is performed, i.e., a direct transmit power control.

[B] First Embodiment

In the wireless communications scheme employing strong error correction codes such as turbo codes or LDPC codes, the receiver end obtains a signal to interference power (SIR) of a reception signal and determines a transmit power for a code block from the SIR and a relative transmit power. The measured SIR is stored by a code block, and a transmit power is determined by calculating AC by the above formula (1). The SIR corresponds to $A_iP_i/N_i$ of the above formula (1).

This AC is that which relates to a transmit power of a signal used in SIR measurement. In order to determine the next transmit power, the AC is calculated under a condition that a relative transmit power is set and the magnitude of the SIR is varied. As expressed by the above formula (3), a value obtained by differentiating the BLER by power is acquired from the AC and the SIR, and a relative transmit power with which the above value becomes a previously set value is obtained. From this relative transmit power and the transmit power of a signal employed in measuring the SIR, the next transmit power is determined.

Figure 2:
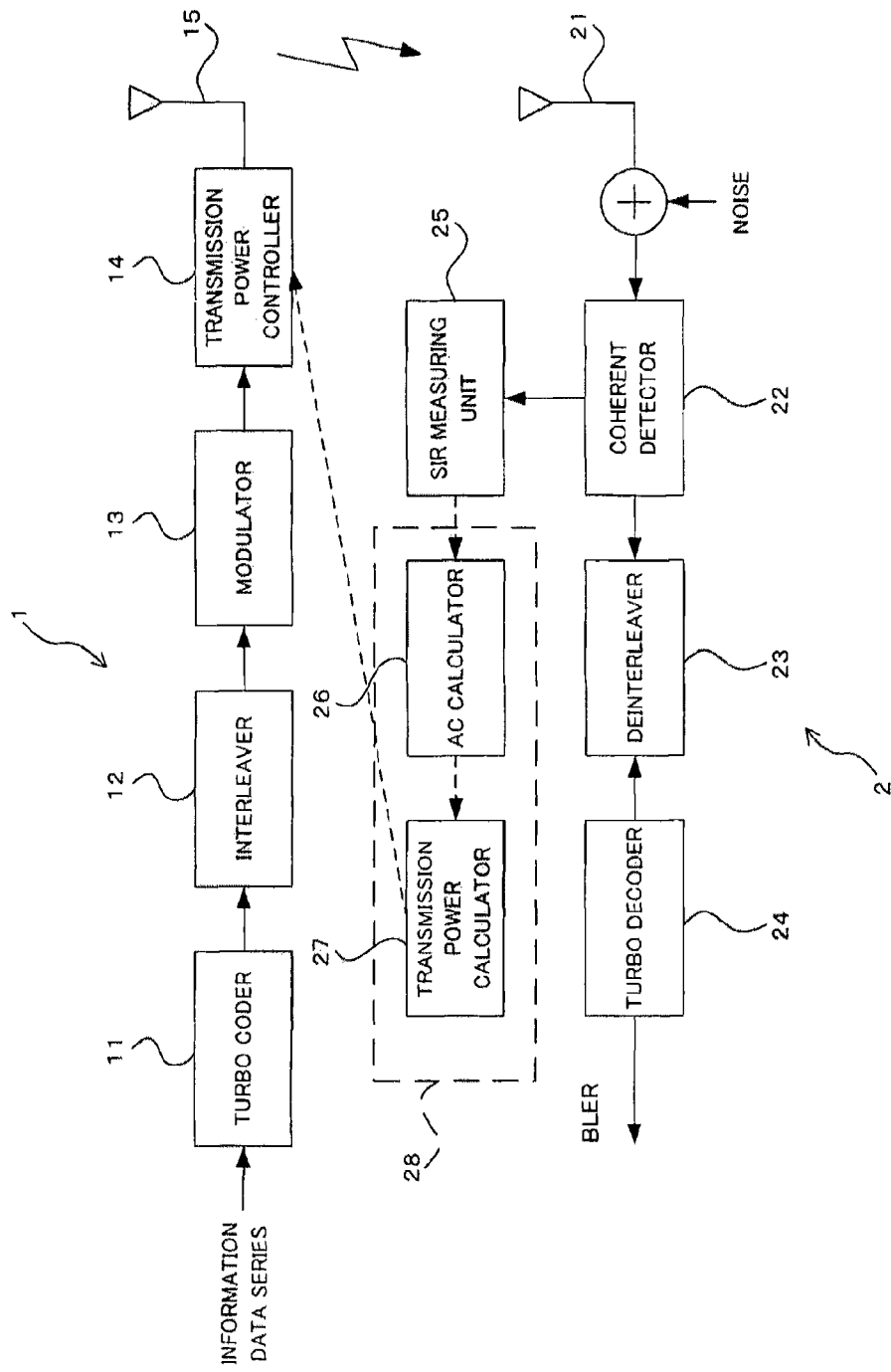
FIG. 2 is a block diagram illustrating a construction of a wireless communications system according to the first embodiment.

As an example of a system to which this scheme is applicable, there is a wireless communications system employing turbo codes as shown in FIG. 2. The system of FIG. 2 has, for example, a transmitter 1 and a receiver 2. The following are an overview description of these with an attention paid to their main functions. The transmitter 1 includes, for example, a turbo coder 11, an interleaver 12, a modulator 13, a power controller 14, and a transmitter antenna 15. The receiver 2 includes, for example, a receiver antenna 21, a coherent detector 22, de-interleaver 23, a turbo decoder 24, an SIR measurer 25, an AC calculator 26, and a transmit power calculator 27. In this instance, the transmitter 1 and the receiver 2 can be used as a transmission device of a wireless base station and a reception device of a mobile terminal, respectively.

Here, on the transmitter 1, the turbo coder 11 performs turbo coding to an information data (symbol) series, which is transmission data; the interleaver 12 interleaves an output of the turbo coder 11; the modulator 13 modulates transmit data after being interleaved with a required modulation scheme such as QPSK; the power controller 14 controls transmit power of the modulated signal obtained by the modulator 13. The modulation signal whose transmit power is controlled is radiated from the transmitter antenna 15 to the receiver 2.

On the other hand, on the receiver 2, the coherent detector 22 performs coherent detection to the signal which is received by the receiver antenna 21 having been subjected to noise due to fading or the like through a wireless propagation path, to detect the reception signal; the de-interleaver 23 de-interleaves the reception signal detected by this coherent detector 22 and restores an information bit series before the interleave by the interleaver 12 performed thereto; the turbo decoder 24 performs turbo decoding to the information bit series to obtain the data transmitted by the transmitter 1.

Further, the SIR measurer 25 measures an SIR from the reception signal detected by the coherent detector 22; the AC calculator (evaluation amount calculating unit) 26 calculates AC by the above formula (1) employing the SIR measured by this SIR measurer 25; the transmit power calculator (transmit power determining unit) 27 calculates (determines) a transmit power based on an AC calculated by this AC calculator 26 and an error rate (BLER) relating to the AC. Following the calculation result, the power controller 14 of the transmitter 1 performs transmit power control.

That is, a block 28 formed by the AC calculator 26 and the transmit power calculator 27 performs a function as a transmit control information generating means which generates transmit control information for transmit power control, based on a certain relationship, independent from propagation circumstances, defined between an evaluation amount AC and an error rate (BLER) relating to a reception condition of a transmit signal of the transmitter 1.

In this instance, the calculation result is able to be sent to the transmitter 1 by, for example, performing wireless communications or the like with the transmitter 1 as signaling, using a non-illustrated transmission system in the receiver 2. This means that the transmit power calculator 27 includes also a function as a notifying means which notifies the transmitter 1 of the above transmit control information by wireless communications or the like. Further, the AC calculator 26 and the transmit power calculator 27 (block 28) can be provided for the transmitter 1. In this case, by means of notifying the transmitter 1 of the SIR measured by the SIR measurer 25 from the receiver 2 through wireless communications or the like, the AC calculator 26 is capable of calculating an AC using the notified SIR.

In the system with the above described construction, on the transmitter 1, an information data series, which is transmit data, is turbo coded by the turbo coder 11, and is then modulated by the modulator 13 after being interleaved by the interleaver 12, and is then transmitted through the transmitter antenna 15 with a transmission power determined by the power controller 14.

On the other hand, on the receiver 2, the signal received by the receiver antenna 21 is detected by the coherent detector 22, and is de-interleaved by the de-interleaver 23, and then is turbo decoded. Further, an SIR is measured by the SIR measurer 25 from the reception signal detected by the coherent detector 22, and on the basis of the measurement result, an AC is calculated by the AC calculator 26. Furthermore, on the basis of the thus obtained AC, a transmit power is calculated and is then notified to the power controller 14 of the transmitter 1.

With such an operation, the power controller 14 of the transmitter 1 adaptively changes a transmit power of the next transmit data, following the thus notified transmit power.

Figure 5:
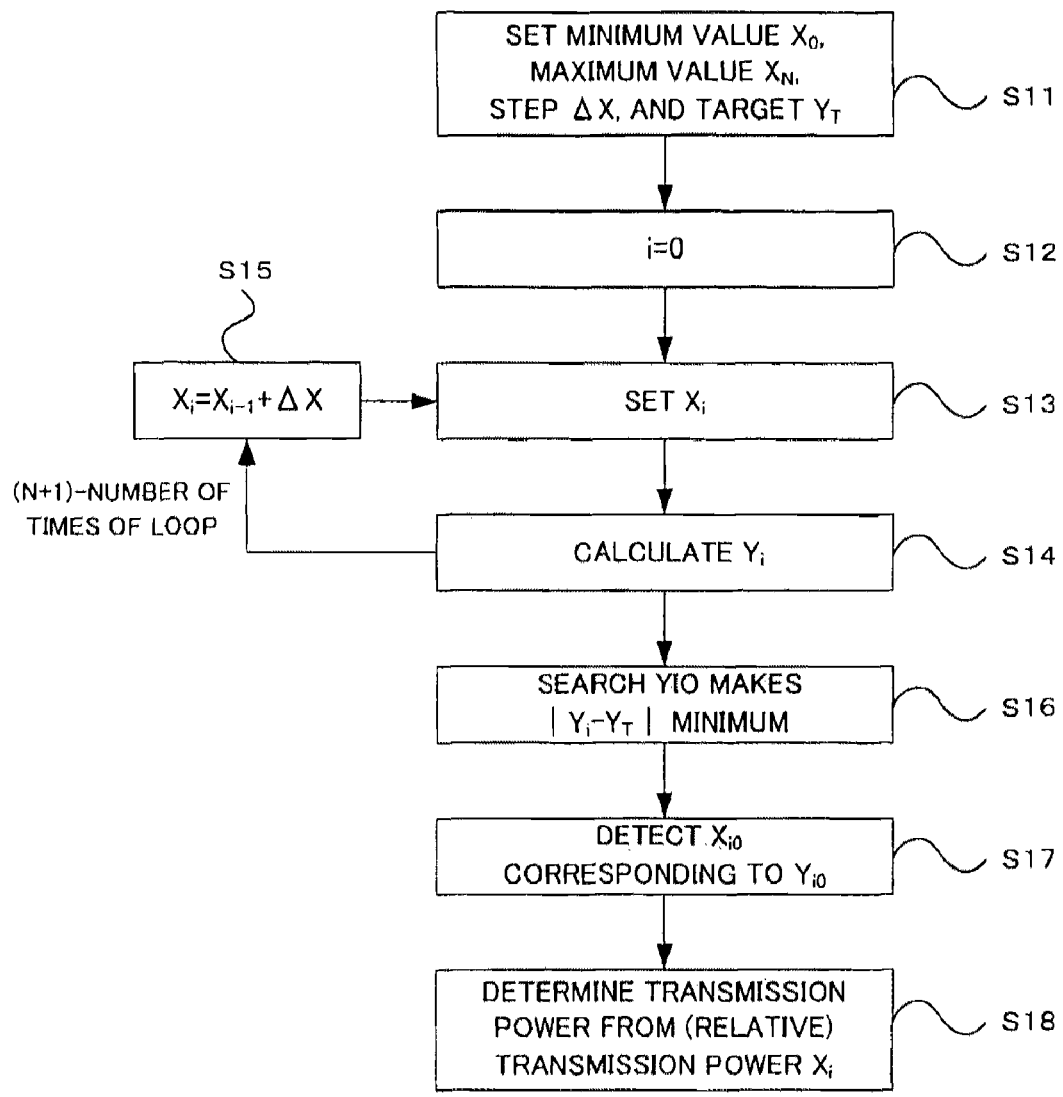
FIG. 5 is a flowchart for describing an example of a method for determining a transmission power in the system shown in FIG. 2.

Here, the use of the following method can be considered. For the purpose of determining the transmit power, a transmit power satisfying the above formula (3) is obtained. As a concrete example, as shown in FIG. 5, the upper and the lower limit of a relative transmit power is set, and the relative transmit power is changed with an appropriate step width, and a relative transmit power with which the constant previously given as in the above formula (3) and an differential value by the power P of the BLER becomes the closest to each other is determined.

That is, the transmit power calculator 27 sets the minimum value of the relative transmit power as $X_0$, the maximum value thereof as $X_N$, the step width of the relative power to be changed as $\Delta X$, a constant of the above formula (3), which acts as a target, as $Y_T$ (step S11). First of all, given that i=0 (step S12), $X_i$ is set (step S13), and a differential value $Y_i$ expressed by the above formula (3) is calculated (step S14). Then, with an increment of i by one, a value obtained by changing (increasing) the transmit power by a step width of $\Delta X$ is re-set as new $X_i$ ($X_i=X_{i-1}+\Delta X$; step S15 and step S13), and a differential value $Y_i$ expressed by the above formula (3) is calculated using this $X_i$ (step S14).

The above processing is repeated until i=N [that is, (N+1)-number of times of loop processing], (N+1)-number of differential values $Y_i$ being thereby obtained. In this instance, for example, each differential value $Y_i$ is sequentially stored in a non-illustrated memory or the like, together with its corresponding relative transmit power $X_i$.

After that, the transmit power calculator 27 researches the above mentioned differential value $Y_i$ for a differential value $Y_{i0}$ with which $|Y_i-Y_T|$ becomes the minimum (step S16), and detects the relative transmit power $X_{i0}$ corresponding to the differential value $Y_{i0}$ (step S17), and a transmit power is determined from the thus detected relative transmit power $X_{i0}$ (step S18).

In this instance, as another transmit power determining method, sequential calculation methods generally used in numerical calculation is applicable such as the method in which the upper and the lower limit of a relative transmit power is gradually narrowed, and upon the time the differential value of a BLER falls within an appropriate range, the power thereof is determined as a transmit power.

For obtaining the differential value ($Y_i$) of a BLER, there is a method, as shown in FIG. 3, for example, in which a BLER ($Z_i$) is calculated for each relative power $X_i$, and a differential is numerically obtained (obtained a difference) as shown in the following formula (4):

$$Y_i=(Z_{i+1}-Z_i)/(X_{i+1}-X_i) \qquad (4)$$

In this case, the relationship between AC and a BLER given by the above formula (1) need not be given by a formula as the above formula (2), it is also possible to be given as a form of a table.

In addition, it is possible to obtain a differential value of a BLER by determining a relationship between an appropriate reception condition including AC and a BLER and having as a table thereof. Further, as shown in FIG. 4, there also is a method in which a differential is given as a calculation formula from the above formulae (1) and (2), and a differential value $Y_i$ is calculated from the SIR measured by the SIR measurer 25 and a relative transmit power $X_i$.

Resulting from the above described transmit power control, the present embodiment performs transmit power control (power distribution) which makes an average BLER the minimum, rather lowering signal quality (BLER) when propagation circumstances are poor, while improving the signal quality when the propagation circumstances are fine, so that it is possible to minimize a total of average transmit power.

Figure 8:
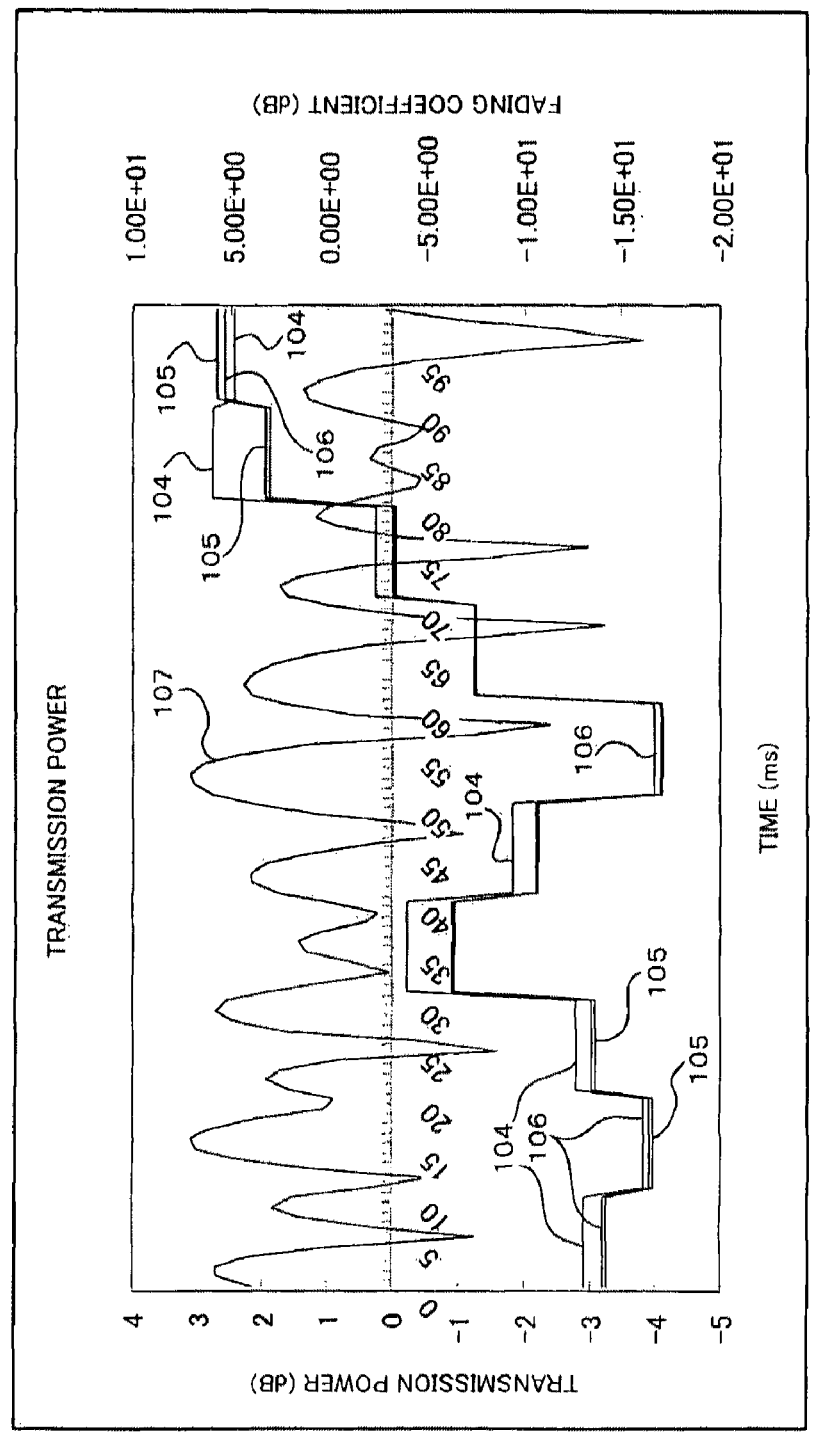
FIG. 8 is a diagram showing a transmission power feature example for making a description in a comparison between power control according to the first embodiment with power control according to the previous example.

For example, given that an average BLER=0.1, changes in a transmit power with the power control schemes according to the previous example 1, the previous example 2, and the present embodiment are shown in FIG. 8. Assuming that 1 coding unit is 10 ms, in a case where a transmit power is controlled for 1 coding unit, an average transmit power is −0.51 dB in a case of the previous example 1 (characteristic 104); −0.80 dB in a case of the previous example 2 (characteristic 105); −0.82 dB in a case of the present embodiment (characteristic 106). In this instance, the reference character 107 indicates a change of a fading coefficient. That is, according to the control scheme of the present embodiment, it is possible to reduce the transmit power by 0.31 dB in comparison with the previous example 1, by 0.02 dB in comparison with the previous example 2.

Figure 9:
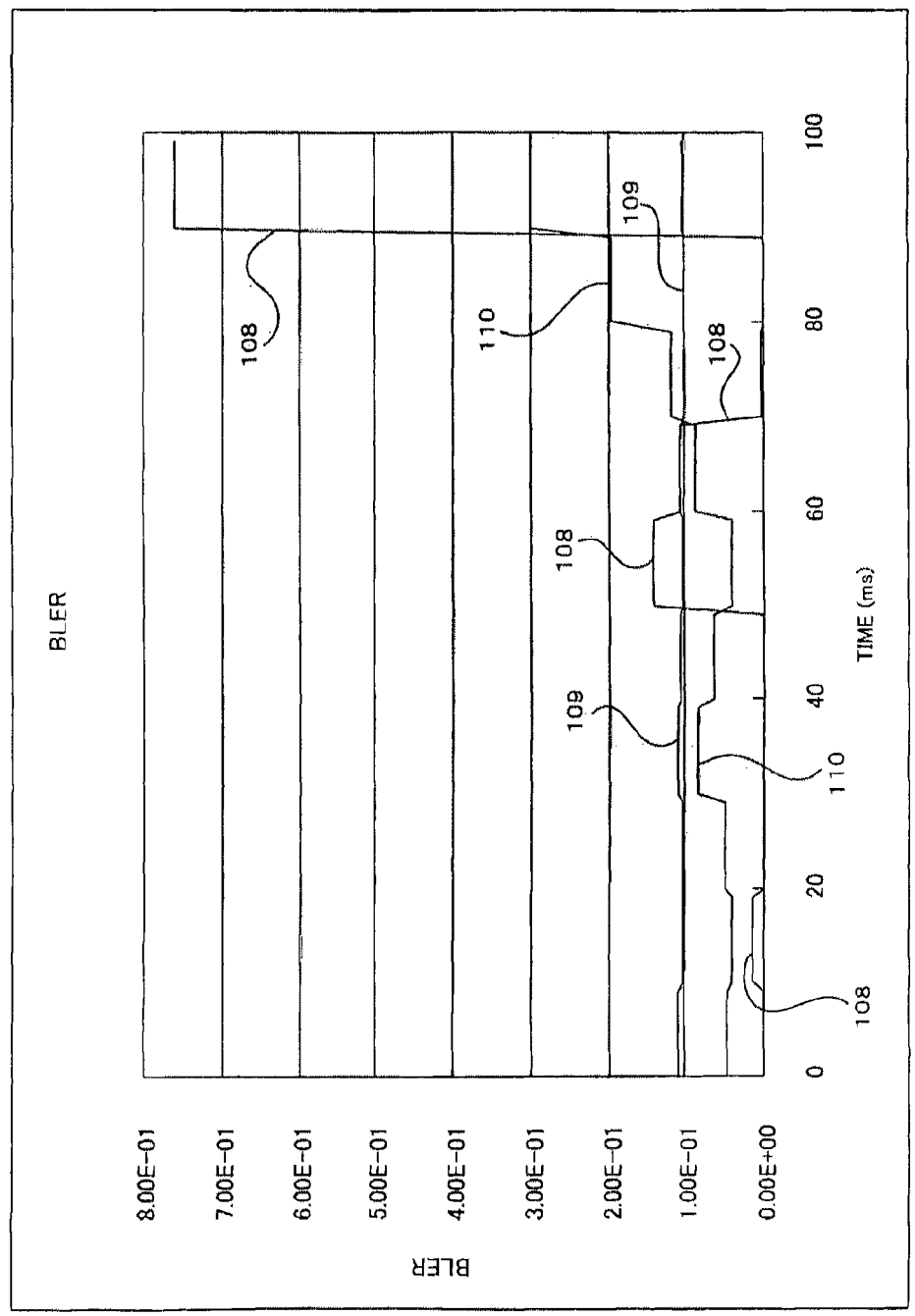
FIG. 9 is a diagram showing a BLER feature example for making a description in a comparison between power control according to the first embodiment with power control according to the previous example.

More precisely, as shown in FIG. 8, when the fading coefficient of a time duration from 0 ms through 79 ms is large, a power of the present embodiment is made to be lager than that of the previous example 2 to make the BLER take a small value as shown in FIG. 9. In the circumstances in which the fading coefficient of a time duration from 80 ms through 99 ms is small, the power becomes small, and the BLER takes a large value as shown in FIG. 9. In this instance, FIG. 9 shows the BLER in a case where the fading coefficient and the transmit power are those which are shown in FIG. 7. In this FIG. 9, the reference character 108, the reference character 109, and the reference character 110 indicate characteristic due to the power control schemes of the previous example 1, the previous example 2, and the present embodiment, respectively.

In this manner, by means of rather enlarging a power to improve the characteristic when propagation circumstances are fine while saving a power when the propagation circumstances are poor to deteriorate the characteristic to a degree, it is possible to decrease the average transmit power with an average characteristic being maintained the same.

(B1) First Modified Example

Figure 12:
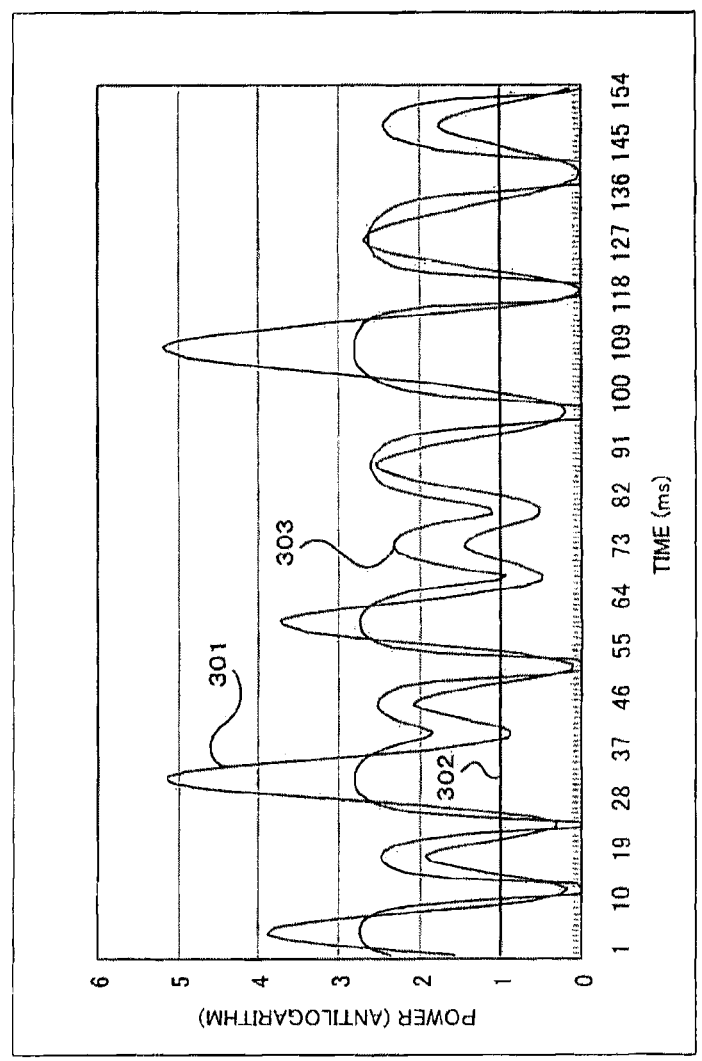
FIG. 12 is a diagram for describing the water filling theory.
Figure 13:
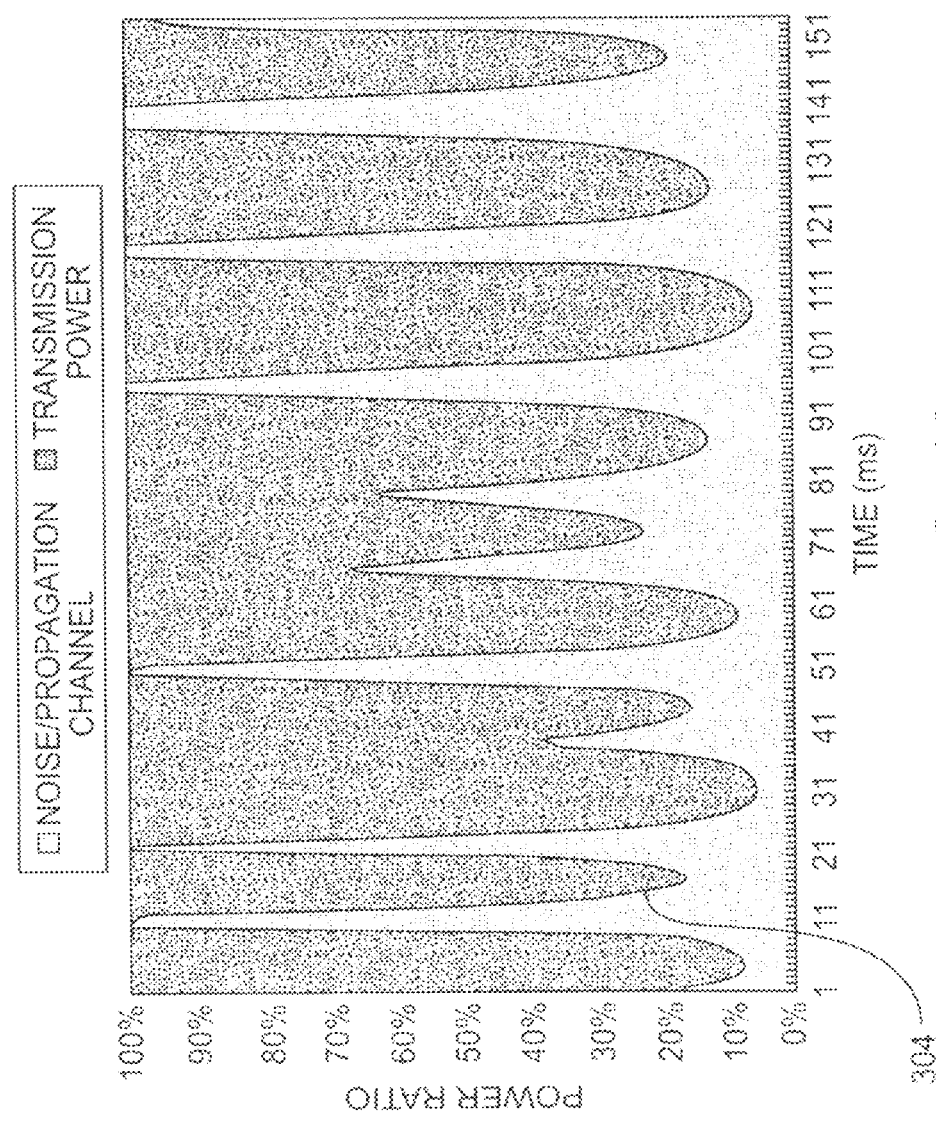
FIG. 13 is a diagram for describing the water filling theory.

The above described example shows the method of determining a transmit power for the unit of code block, and it is also possible to control a transmit power in a code block appropriately. Taking the above formula (1) into account, control in a code block is that which follows the well-known water filling theory (see FIG. 12 and FIG. 13). In this instance, FIG. 12 shows changes of propagation channels, noise, and a transmit power against time elapsing (ms). The reference character 301 indicates change of propagation channels; the reference character 302 indicates change of noise; the reference character 303 indicates change of a transmit power. FIG. 13 shows change of a value obtained by dividing the noise shown in FIG. 12 by a propagation channel, and the upper area with a curve 304 as a border thereof expresses a transmit power. That is, when an arbitrary power ratio is given as a borderline, the transmit power control shown by the area, of the above mentioned upper area, surrounded by the border line and the curve 304, makes it possible to realize the optimal power control.

Figure 10:
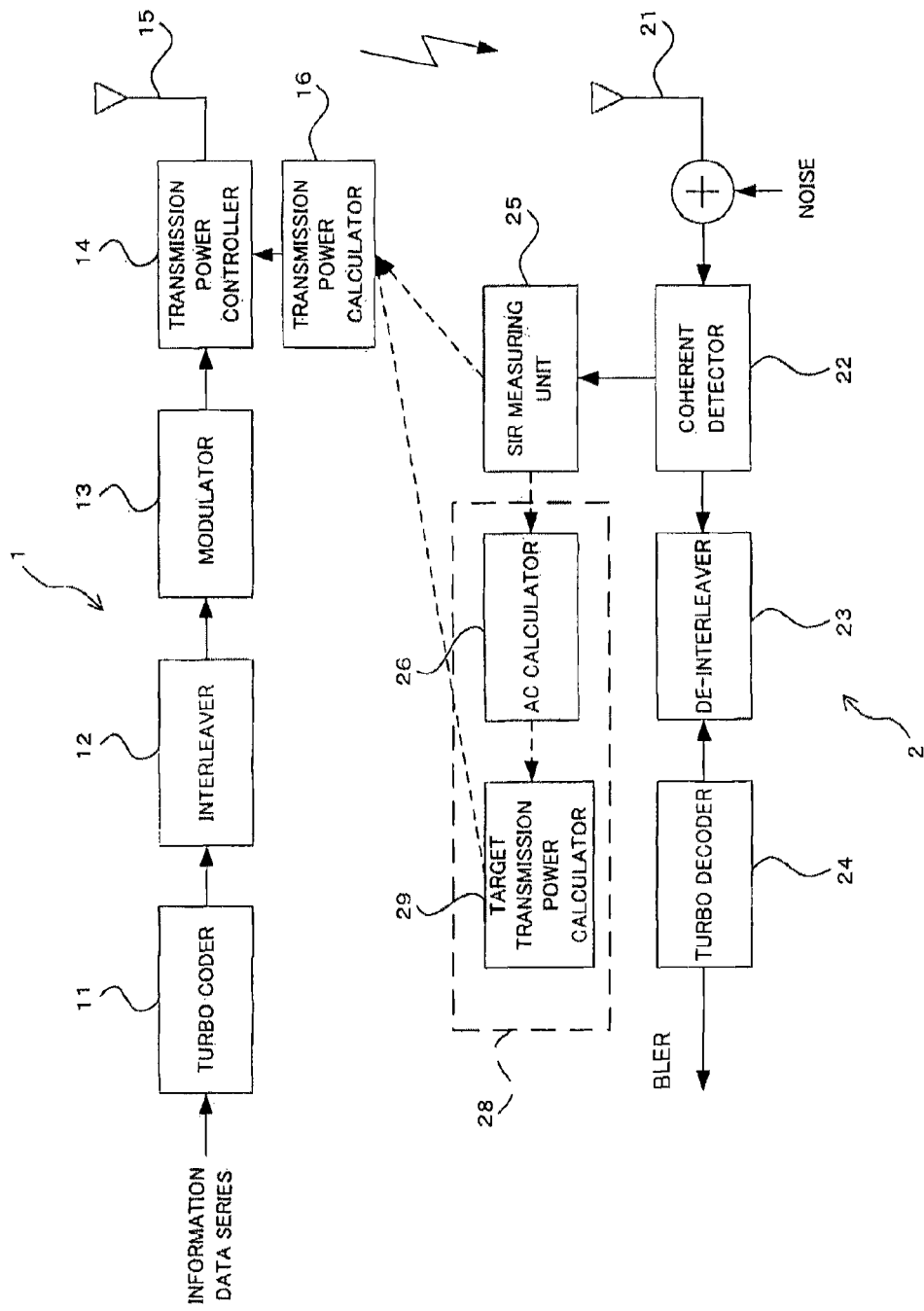
FIG. 10 is a diagram showing a construction of a wireless communications system according to a modified example of the first embodiment.

As to the inside of a code block, a construction example of a wireless communications system in a case where control is executed by the symbol unit or by the multiple symbol units. The system shown in FIG. 10 also includes, for example, a transmitter 1 and a receiver 2. In the present example, also, an overview of the present example will be described with an attention paid to each main function. The transmitter 1 of FIG. 10 includes, for example, not only a turbo coder 11, an interleaver 12, a modulator 13, a power controller 14, and a transmitter antenna 15, which are similar to those which have already described, but also a transmit power calculator 16. The receiver 2 includes, for example, not only a receiver antenna 21, a coherent detector 22, de-interleaver 23, a turbo decoder 24, an SIR measurer 25, and an AC calculator 26, but also a target transmit power calculator 29. In this instance, in the present embodiment, also, the transmitter 1 and the receiver 2 can be used as a transmission device of a wireless base station and a mobile terminal of a reception device, respectively.

Here, in the transmitter 1, the transmit power calculator 16 receives the SIR measured by the SIR measurer 25 of the receiver 2 and a notification of a target transmit power calculated by the target transmit power calculator 29, and on the basis of these, it calculates a transmit power. In this instance, transmission of an SIR from the receiver 2 to the transmitter 1 can be an absolute value or a variation amount.

On the other hand, on the receiver 2, the target transmit power calculator 29 calculates a target transmit power (target value). Here, the above formula (3) in a case where power control is executed by the unit of code block is expressed by the following formula (5):

$$\frac{df(P)}{dP} = \exp[a_0 + a_1 C(P) + a_2 C(P)^2](a_1 + 2a_2 C(P)) \frac{1}{M} \sum_{m=0}^{M-1} \frac{1}{1/SIR_m + P} \quad (5)$$

The above formula (3) in a case where power control is executed by the shorter divisional unit (the unit of a symbol or the unit of more than one symbol) is expressed by the following formula (6):

$$\frac{df(P)}{dP} = \exp[a_0 + a_1 C(P) + a_2 C(P)^2](a_1 + 2a_2 C(P)) \frac{1}{M} \frac{1}{1/SIR_m + P_m} \quad (6)$$

Figure 11:
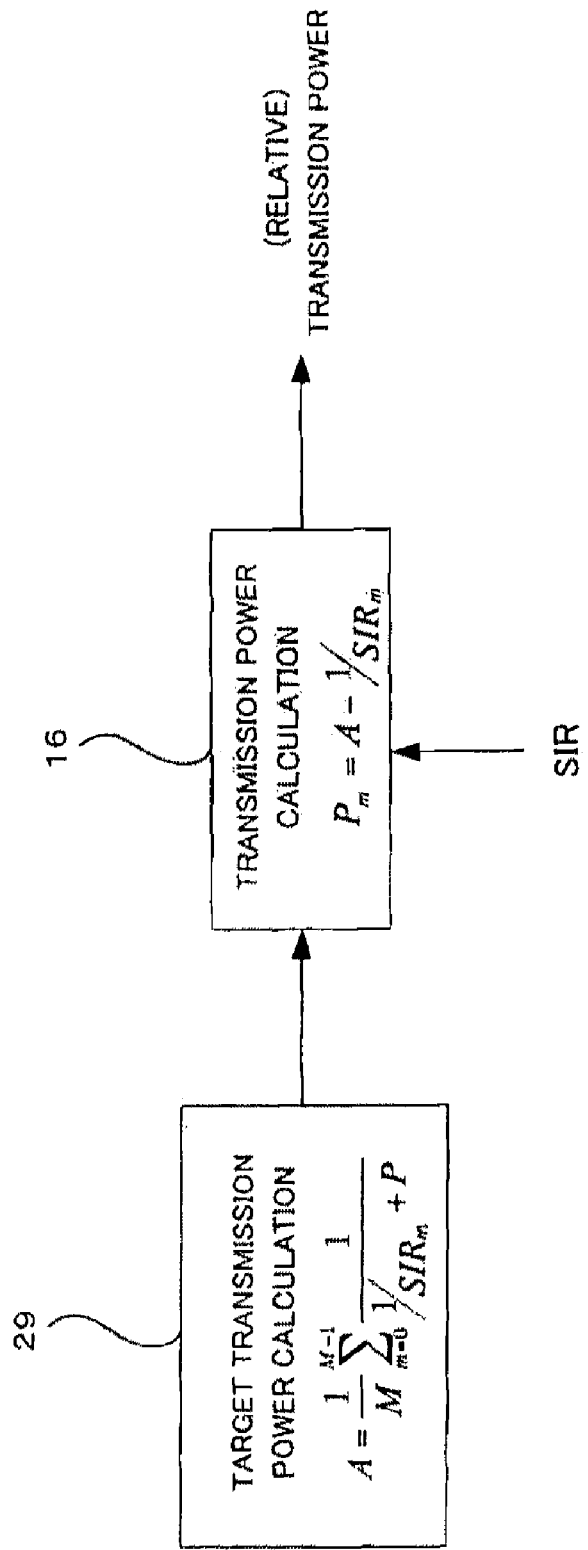
FIG. 11 is a diagram for describing an example of a method for determining a transmission power in a code block in the system shown in FIG. 10.

Hence, as shown in FIG. 11, when the target transmit power calculator 29 calculates the target value A corresponding to the transmit power using the following formula (7), the transmit power calculator 16 of the transmitter 1 is capable of obtaining a relative transmit power ($P_m$) using the following formula (8). That is, a value obtained by subtracting a reciprocal of the SIR measured by the SIR measurer 25 from the target value A becomes a relative transmit power ($P_m$):

$$A = \frac{1}{M} \sum_{m=0}^{M-1} \frac{1}{1/SIR_m + P} \quad (7)$$

$$A = 1/SIR_m + P_m \quad (8)$$

That is, in the present example, a block 28 formed by the AC calculator 26 and the target transmit power calculator 29 performs a function as a transmit control information generating means which generates transmit control information for transmit power control, based on a certain relationship, independent from propagation circumstances, defined between an evaluation amount AC and an error rate (BLER) relating to a reception condition of a transmit signal of the transmitter 1. Further, the block 28 controls a transmit power based on a certain relationship defined between the AC and the BLER relating to inter-code block unit with a transmit power in a code block being constant, or the block 28 divides a code block into multiple divisional units, and controls a transmit power relating to inter-divisional unit based on a certain relationship defined between the AC and the BLER.

Further, transmission of the result of the calculation obtained by the target transmit power calculator 29 to the transmitter 1 can be realized by, for example, performing wireless communications with the transmitter 1 as signaling using a non-illustrated transmission system in the receiver 2. That is, the target transmit power calculator 29 has also a function as a notifying means which notifies the transmitter 1 of the above calculation result as transmit control information with wireless communications or the like.

In this instance, according to the present example, also, the block 28 can be provided for the transmitter 1. The notification of the SIR, measured by the SIR measurer 25 of the receiver 2, from the receiver 2 to the transmitter 1 with wireless communications or the like makes it possible to calculate AC by use of the SIR having been notified.

As described above, according to the present modified example, since transmit power is able to be controlled based on a certain relationship defined between AC and a BLER not only for inter-code block but also in a code block, it is possible to optimize also a transmit power in a code block based on a certain relationship defined between the AC and the BLER, so that efficient transmit power control can be realized.

Figure 14:
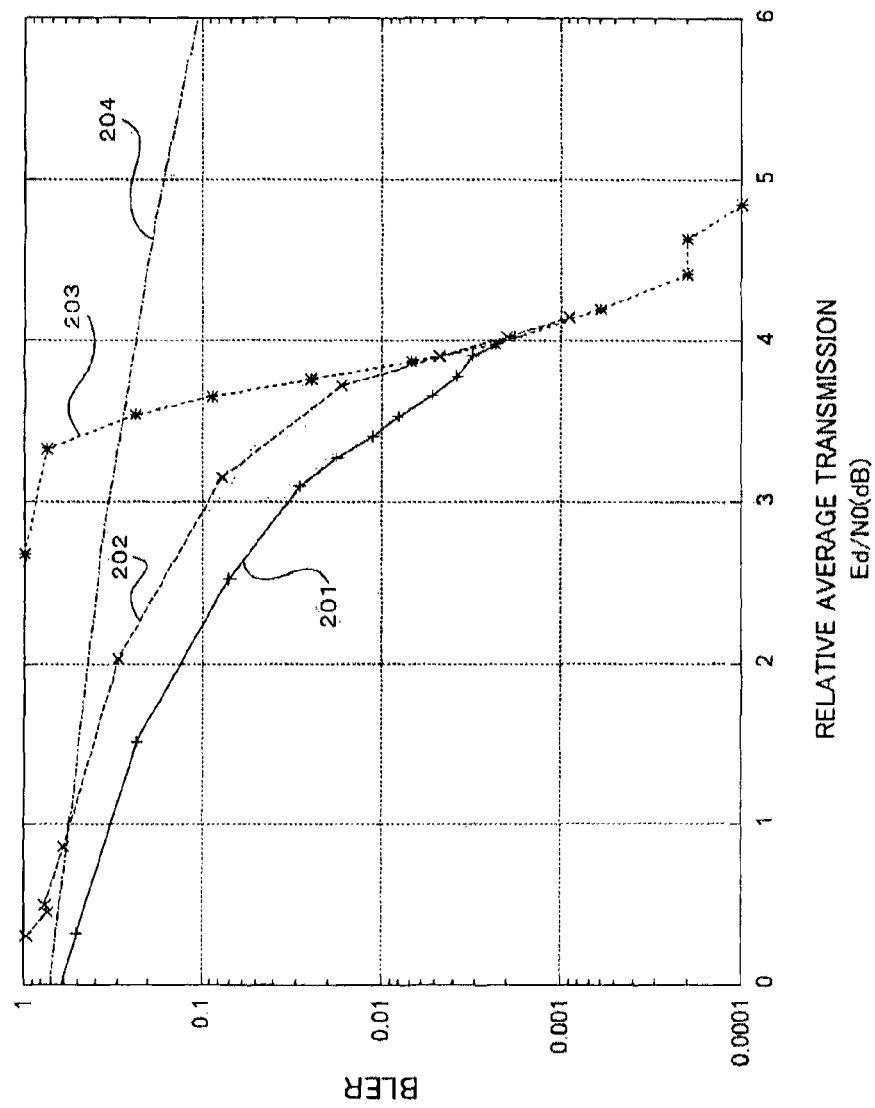
FIG. 14 is a graph indicating an example of a BLER feature against SNR (relative average transmission Eb/N0) for making a description in comparison of power control according to the preset embodiment with power control according to the previous example.

In this instance, FIG. 14 shows an example of a BLER feature relating to relative averaged transmitted Eb/N0 due to the difference of the power control schemes in comparison with there among. This FIG. 14 shows features in circumstances in which the number of transmit data bits (transmit block size) is 3000, and a fading frequency is about 80 Hz. (a) The reference character 201 indicates a characteristic when transmit power is optimized for the inside of a code block and inter-code block, each; (b) the reference character 202 indicates a characteristic when transmit power is optimized relating to inter-code block with a transmit power in a code block being constant; (c) the reference character 203 indicates a characteristic when transmit power control in the previous example 2 is performed [when a transmit power in a code block is maintained constant, and the above formula (4) is maintained constant for inter-code block]; (d) the reference character 204 indicates a characteristic when transmit power is maintained constant.

This FIG. 14 clarifies that the characteristic is fine (a required transmit power is low) when a BLER=0.1 in the order of the above items (a), (b), (c), and (d). Further, in a case of transmit power control of, for example, the above items (b), it is understandable that the characteristic (relative averaged transmitted Eb/N0) is improved by the degree of 0.8 dB at a BLER=0.1 in comparison with the above previous example (c).

[C] Second Embodiment

Figure 16A:
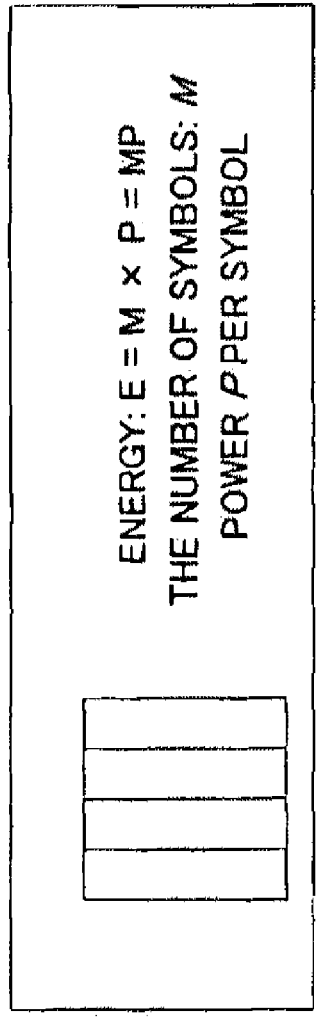
Figure 16B:
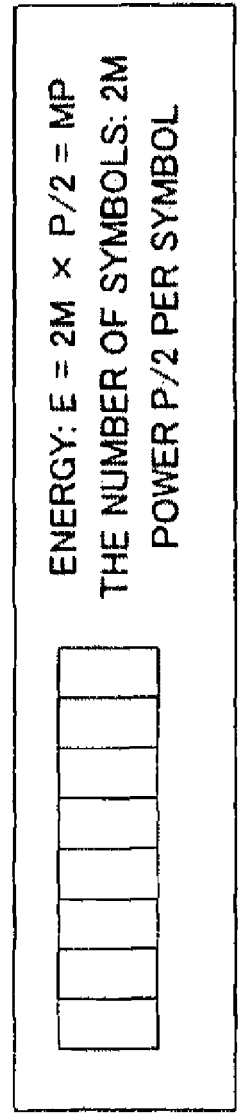

According to the present embodiment, the above formulae (1) and (2) are applied to controlling of a transmit communications rate. For example, as schematically shown in FIG. 16(A) and FIG. 16(B), if transmit power is controlled in such a manner that the energy per code block is constant, a power per symbol is in inverse proportion to the number of symbols (M) transmitted per code block. That is, as shown in FIG. 16(A), assuming that a power per symbol is P and the number of symbols per code block is M, energy E is expressed by E=M×P=MP. In contrast, as shown in FIG. 16(B), when a power per symbol is made to be a half of it, i.e., P/2, the number of symbols per code block required for obtaining energy E (=MP) per code block the same as that in FIG. 16(A) becomes 2M (E=2M×P/2=MP) (doubled).

Accordingly, the AC of the above formula (1) is decreased when the number of symbols is increased, an error rate of the above formula (2) being thereby increased. Hence, it is possible to maximize a throughput by means of making the number of information bits corresponding to the number of symbols be the number of transmit data bits (transmit data amount) under a condition in which the number of symbols which maximizes (the number of symbols×[1−the error rate f(P) of the above formula (2)]. FIG. 15 shows an example of the construction of a wireless communications system to which this transmit rate control is applied.

The system shown in FIG. 15 also includes, for example, a transmitter 1 and a receiver 2. An overview of the present example will be described with an attention paid to each main function. The transmitter 1 includes, for example, not only a turbo coder 11, an interleaver 12, a modulator 13, and a transmitter antenna 15, which are similar to those which have already been described, but also a data rate controller 10 and a buffer (data sequence buffer) 17. The receiver 2 includes, for example, not only a receiver antenna 21, a coherent detector 22, de-interleaver 23, a turbo decoder 24, an SIR measurer 25, and an AC calculator 26, but also a transmit data rate calculator 30 and an H-ARQ data combiner 31. In this instance, in the present embodiment, also, the transmitter 1 and the receiver 2 can be used as a transmission device of a wireless base station and a reception device of a mobile terminal, respectively.

Here, in the transmitter 1, the data rate controller 10 controls a transmit data rate by means of adjusting a transmit data amount to be supplied to the turbo coder 11. In the present example, the data rate controller 10 receives a notification of a transmit data rate calculated by the transmit data rate calculator 30 of the receiver 2, and executes transmit data rate control according to the thus obtained transmit data rate. In this instance, transmission of the transmit data rate to the transmitter 1 can be realized by, for example, performing wireless communications with the transmitter 1 as signaling using a non-illustrated transmission system in the receiver 2.

Further, the buffer 17 temporally holds (buffers) the coded data which have been turbo coded by the turbo coder 11 in preparation to re-transmit control called Hybrid-Automatic Repeat reQuest (H-ARQ). When the receiver 2 end cannot correctly decode reception data, the receiver 2 receives a re-transmission request (a NACK signal), and a division of transmit data thereof is taken out from the buffer 17 in accordance with the re-transmission request and is then re-transmitted.

On the other hand, in the receiver 2, the transmit data rate calculator (transmit rate determiner) 30 determines a transmit data rate (the number of transmit data bits) based on an evaluation amount C(P) calculated by the AC calculator 26 and the error rate relating to the evaluation amount C(P) in a certain relationship defined as the above formula (2), that is, an error rate f(P) expressed by the above formula (2), and generates transmit control information thereof as transmit control information for the data rate controller 10 of the transmitter 1.

The H-ARQ data combiner 31 stores reception data and combines reception data which has not been decoded correctly and reception data re-transmitted by the above described re-transmission control.

That is, in the present example, the block 28 formed by the AC calculator 26 and the transmit data rate calculator 30 functions as a transmit control information controlling means which generates transmit control information for controlling the transmit rate of a transmit signal of the transmitter 1 based on a certain relationship independent from propagation circumstances, which relationship is defied between an evaluation amount C(P) and an error rate (BLER) relating to a reception condition of a transmit signal of the transmitter 1.

In this instance, as to transmission of a result of calculation obtained by the transmit data rate calculator 30 to the transmitter 1 (data rate controller 10), also, it is possible to realize the transmission thereof as signaling by performing radio communications or the like using, for example, a non-illustrated transmit system of the receiver 2. That is, the transmit data rate calculator 30 also has a function as a notifying means which notifies the transmitter 1 of the above calculation result as transmit control information with wireless communications or the like.

Further, according to the present example, also, the block 28 can be provided for the transmitter 1. The notification of the SIR, measured by the SIR measurer 25 of the receiver 2, from the receiver 2 to the transmitter 1 with wireless communications or the like makes it possible to calculate AC by use of the SIR having been notified.

In a system with the construction described above, on the transmitter 1, an information data series, which is transmit data, is turbo coded by the turbo coder 11 and interleaved by the interleaver 12 after being temporally buffered in the buffer 17 in preparation for the above described re-transmit control, and is then modulated by the modulator 13 and then transmitted through the transmitter antenna 15 with a certain transmission power.

On the other hand, on the receiver 2, the signal received through the receiver antenna 21 is detected by the coherent detector 22, and is subjected to combining processing by the H-ARQ data combiner 31 when the reception data is re-transmitted data after being de-interleaved by the de-interleaver 23, and then is turbo decoded by the turbo decoder 24.

Further, the SIR measurer 25 detects an SIR from the reception signal detected by the coherent detector 22. On the basis of the measurement result, AC is calculated by the AC calculator 26. Furthermore, a transmit data rate is calculated by the transmit data rate calculator 30 based on the thus obtained AC, and is then notified to the data rate controller 10 of the transmitter 1. With this, the data rate controller 10 adaptively changes a transmit data rate of the next transmit data in accordance with the thus notified transmit data rate.

Here, in order to determine a transmit data rate, for example, the following method is considerable. The upper and the lower limit of the number $X_i$ of relative transmit data bits is set, and the number $X_i$ of relative transmit data bits is changed with an appropriate number of bits, and the number $X_i$ of transmit data bits which makes the number $Y_i$ of the receivable bits, obtained as a multiplication value between a BLER and the number $X_i$ of transmit data bits, be the maximum is determined as the number of relative transmit data bits.

That is, as shown in FIG. 18, the transmit data rate calculator 30 sets the minimum value of the number of transmit data bits as $X_0$, the maximum value thereof as $X_N$, and the number of transmit data bits to be changed as $\Delta X$ (step S21). First of all, assuming i=0 (step S22), $X_i$ is set (step S23), and the number $Y_i$ of receivable bits is calculated (step S24). In this instance, as shown in FIG. 17, the number $Y_i$ of receivable bits can be obtained from an error rate (BLER) of the above formula (2) and the number $X_i$ of transmit data bits in the AC calculator 26 [$Y_i=(1-BLER)\times X_i$].

Then, with increment of i by one, a value obtained by changing (increasing) the number of transmit data bits by the number $\Delta X$ of bits is re-set as new $X_i$ ($X_i=X_{i-1}+\Delta X$; step S25 and step S23), and the number $Y_i$ [$Y_i=(1-BLER)\times X_i$] of receivable bits is calculated using this $X_i$ (step S24).

Repeating the above processing until i=N [that is, (N+1)-number of times of loop processing] makes it possible to obtain (N+1)-number of receivable bits $Y_i$. In this instance, each of the number $Y_i$ of receivable bits thus obtained is, for example, sequentially stored in a non-illustrated memory or the like together with the number $X_i$ of transmit data bits corresponding thereto.

After that, the transmit data rate calculator 30 researches the numbers $Y_i$ of receivable bits for the maximum number $Y_{i0}$ of receivable bits (step S26), and detects the number $X_{i0}$ of transmit data bits corresponding to the number $Y_i$ of receivable bits (step S27), and then determines the thus detected number $X_{i0}$ of transmit data bits as the number of the next transmit data bits (step S28).

In this manner, it is possible to make the number of information bits corresponding to the number of symbols taking [the number of symbols (transmit data amount)]×[1−an error rate f(P) of the above formula (2)] as the maximum value thereof be the number of transmit data bits, so that a throughput to the receiver 2 (that is, a downlink throughput) can be made to be the maximum.

In this instance, the present example is on the assumption of a wireless communications system to which H-ARQ is applied, but the above described data rate control is similarly applicable to wireless communications systems which do not perform re-transmission control.

Further, the present invention should by no means be limited to the above-illustrated embodiments, and various changes or modifications may be suggested without departing from the gist of the invention.

INDUSTRIAL APPLICABILITY

As detailed in the above description, the present invention clarifies the relationship between the evaluation amount (AC) and an error rate (BLER), and optimizes the power control method (transmit power distribution) between code blocks, thereby realizing an efficient power control or transmit rate control. The present invention is thus considered to be significantly useful in the field of wireless communications technology.

What is claimed is:

1. A transmission controlling method for use in a wireless communications system including: a transmitter which codes a transmission signal with use of an error correction code exhibiting a tendency of a communications capacity being close to its theoretical value; and a receiver which receives the transmission signal from the transmitter, said transmission controlling method comprising:

on the transmitter, defining a certain relationship for a unit of code between an evaluation amount relating to a reception condition of the transmission signal and an error rate of a code block obtained from reception power quality on the receiver, which relationship is independent from propagation circumstances between the transmitter and the receiver; and controlling a transmission power of the transmission signal to be transmitted from the transmitter, using a transmission control information generator, based on the defined relationship, wherein the evaluation amount C(P) is expressed by the following formula (A) and the error rate is related to the evaluation amount C(P):

$$C(P) = \frac{1}{M} \sum_{i=0}^{M-1} \log\left(1 + \alpha \frac{A_i P_i}{N_i}\right) \quad (A)$$

where P is transmission power; A is a channel value of a propagation path in the propagation circumstances; N is interference and noise power in the propagation circumstances; a is a constant; M is a number of symbols in a unit of coding or the number of blocks each formed by a plurality of symbols, and wherein
the error rate is expressed by the following formula (B):

$$f(P) = \exp[a_0 + a_1 C(P) + a_2 C(P)^2] \quad (B)$$

where each of the $a_0$, $a_1$, and $a_2$ is a constant.

2. The transmission controlling method as set forth in claim 1, wherein the transmission power control is executed in such a manner that a differential value by the power P in the formula (B) takes a fixed value.

3. The transmission controlling method as set forth in claim 1, wherein the transmission power control is executed for inter-code block under the transmission power in a code block being constant.

4. The transmission controlling method as set forth in claim 1, wherein the transmission power control is executed for inter-divisional unit obtained by dividing the code block.

5. A transmission controlling method for use in a wireless communications system including: a transmitter which codes a transmission signal with use of an error correction code exhibiting a tendency of a communications capacity being close to its theoretical value; and a receiver which receives the transmission signal from the transmitter, said transmission controlling method comprising:
on the transmitter,
defining a certain relationship for a unit of code block between an evaluation amount relating to a reception condition of the transmission signal and an error rate of a reception signal on the receiver, which relationship is independent from propagation circumstances between the transmitter and the receiver; and
controlling a transmission rate of the transmission signal to be transmitted from the transmitter, using a transmission control information generator, based on the defined relationship, wherein
the evaluation amount C(P) is expressed by the following formula (A) and the error rate is related to the evaluation amount C(P):

$$C(P) = \frac{1}{M} \sum_{i=0}^{M-1} \log\left(1 + \alpha \frac{A_i P_i}{N_i}\right) \quad (A)$$

where P is transmission power; A is a channel value of a propagation path in the propagation circumstances; N is interference and noise power in the propagation circumstances; a is a constant; M is a number of symbols in a unit of coding or the number of blocks each formed by a plurality of symbols, and wherein
the error rate is expressed by the following formula (B):

$$f(P) = \exp[a_0 + a_1 C(P) + a_2 C(P)^2] \quad (B)$$

where each of the $a_0$, $a_1$, and $a_2$ is a constant.

6. The transmission controlling method as set forth in claim 5, wherein determination of the transmission power is executed in such a manner that a multiplication value between the transmission data amount of the transmission signal and (1−the error rate) takes the maximum value.

7. A receiver for use in a wireless communications system including: a transmitter which codes a transmission signal with use of an error correction code exhibiting a tendency of a communications capacity being close to its theoretical value; and a receiver which receives the transmission signal from the transmitter, said receiver comprising,
a transmission control information generator that generates transmission control information for controlling a transmission power of the transmission signal to be transmitted from the transmitter based on a certain relationship for a unit of code block defined between an evaluation amount relating to a reception condition of the transmission signal and an error rate of a code block obtained from reception power quality, which relationship is independent from propagation circumstances between the transmitter and the receiver; and
a notifier that notifies the transmitter of the transmission control information generated by said transmission control information generator, wherein
said transmission control information generator including:
an evaluation amount calculating unit which calculates the evaluation amount C(P) using the following formula (A); and
a transmission power determining unit which determines the transmission power and performs generation thereof as the transmission control information based on the calculated evaluation amount C(P) and the error rate relating to the evaluation amount C(P), and performs generation thereof as the transmission control information:

$$C(P) = \frac{1}{M} \sum_{i=0}^{M-1} \log\left(1 + \alpha \frac{A_i P_i}{N_i}\right) \quad (A)$$

where P is transmission power; A is a channel value of a propagation path in the propagation circumstances; N is interference and noise power in the propagation circumstances; a is a constant; M is a number of symbols in a unit of coding or the number of blocks each formed by a plurality of symbols, and wherein
said transmission power determining unit determines the transmission power based on a relationship between the evaluation amount C(P) calculated by said evaluation amount calculating unit and an error rate f(P) expressed by the following formula (B):

$$f(P) = \exp[a_0 + a_1 C(P) + a_2 C(P)^2] \quad (B)$$

where each of the $a_0$, $a_1$, and $a_2$ is a constant.

8. The receiver as set forth in claim 7, wherein said transmission power determining unit determines the transmission power in such a manner that a differential value by the power P in the above formula (B) takes a fixed value.

9. The receiver as set forth in claim 7, wherein said transmission control information generating unit generates the transmission power control information for controlling the transmission power relating to inter-code block under the transmission power of inter-code block being constant.

10. The receiver as set forth in claim 7, wherein said transmission control information generating unit generates the transmission control information for controlling the transmission power for inter-divisional unit obtained by dividing the code block.

11. A receiver for use in a wireless communications system including: a transmitter which codes a transmission signal with use of an error correction code exhibiting a tendency of a communications capacity being close to its theoretical value; and a receiver which receives the transmission signal from the transmitter, said receiver comprising:
- a transmission control information generator that generates transmission control information for controlling a transmission rate of the transmission signal to be transmitted from the transmitter based on a certain relationship for a unit of code block defined between an evaluation amount relating to a reception condition of the transmission signal and an error rate of a code block obtained from reception power quality, which relationship is independent from propagation circumstances between the transmitter and the receiver; and
- a notifier that notifies the transmitter of the transmission control information generated by said transmission control information generator, wherein said transmission control information generator includes:
- an evaluation amount calculating unit which calculates an evaluation amount C(P) expressed by the following formula (A) as the evaluation amount; and
- a transmission power determining unit which determines the transmission rate and performs generation thereof as the transmission control information based on an evaluation amount C(P) calculated by said evaluation amount calculating unit and on the error rate relating to the evaluation amount C(P) in the certain relationship:

$$C(P) = \frac{1}{M} \sum_{i=0}^{M-1} \log\left(1 + \alpha \frac{A_i P_i}{N_i}\right) \quad (A)$$

where P is transmission power; A is a channel value of a propagation path in the propagation circumstances; N is interference and noise power in the propagation circumstances; a is a constant; M is a number of symbols of a unit of coding or the number of blocks each formed by a plurality of symbols, and wherein
- said transmission rate determining unit determines the transmission rate based on a relationship between the evaluation amount C(P) calculated by said evaluation amount calculating unit and an error rate f(P) expressed by the following formula (B):

$$f(P) = \exp[a_0 + a_1 C(P) + a_2 C(P)^2] \quad (B)$$

where each of the $a_0$, $a_1$, and $a_2$ is a constant.

12. The receiver as set forth in claim 11, wherein said transmission rate determining unit determines the transmission data amount in such a manner that a multiplication value between the transmission data amount of the transmission signal and (1−the error rate) takes the maximum value.

* * * * *